US007899024B2

(12) United States Patent  
Chou

(10) Patent No.: US 7,899,024 B2  
(45) Date of Patent: *Mar. 1, 2011

(54) METHOD AND APPARATUS TO SUPPORT VOIP CALLS IN AN IEEE 802.16 INTERFACE

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 884 days.

This patent is subject to a terminal disclaimer.

(21) Appl. No.: 11/680,351

(22) Filed: Feb. 28, 2007

(65) Prior Publication Data

US 2008/0205452 A1 Aug. 28, 2008

(51) Int. Cl.
H04B 7/212 (2006.01)
(52) U.S. Cl. .......... 370/348; 370/236; 370/328; 370/322
(58) Field of Classification Search .................. 370/468, 370/439, 261, 265, 236, 328, 322, 348
See application file for complete search history.

(56) References Cited

U.S. PATENT DOCUMENTS

| 6,708,207 | B1 | 3/2004 | Sabelhaus et al. |
| 6,807,193 | B1 * | 10/2004 | Beser ............................ 370/498 |
| 6,950,399 | B1 * | 9/2005 | Bushmitch et al. ........... 370/236 |
| 7,339,913 | B2 | 3/2008 | Chou et al. |
| 7,369,856 | B2 | 5/2008 | Ovadia |
| 7,522,570 | B2 | 4/2009 | Kim et al. |
| 7,596,118 | B2 * | 9/2009 | Kim et al. ...................... 370/330 |
| 7,616,962 | B2 | 11/2009 | Oswal et al. |
| 7,656,890 | B2 | 2/2010 | Chapman et al. |
| 2005/0018651 | A1 | 1/2005 | Yan et al. |
| 2005/0063330 | A1 | 3/2005 | Lee et al. |
| 2005/0185656 | A1 | 8/2005 | Svensson et al. |
| 2005/0215279 | A1 * | 9/2005 | Shim et al. ................. 455/550.1 |
| 2005/0239465 | A1 | 10/2005 | Lee et al. |
| 2006/0039313 | A1 | 2/2006 | Chou et al. |

(Continued)

FOREIGN PATENT DOCUMENTS

EP 1753188 2/2007

OTHER PUBLICATIONS 802.16, IEEE Standard for Local and metropolitan area networks, Part 16: Air Interface for Fixed Broadband Wireless Access Systems, IEEE Computer Society and the IEEE.

(Continued)

Primary Examiner — Ricky Ngo  
Assistant Examiner — Dewanda Samuel  
(74) Attorney, Agent, or Firm — Schwabe, Williamson & Wyatt, P.C.

(57) ABSTRACT

In some embodiments, an apparatus includes a connect control module adapted to receive a dynamic service addition message containing a reserved bandwidth amount of a reserved bandwidth allocation for an uplink service flow. The reserved bandwidth allocation is capable of accommodating two or more Voice over Internet Protocol (VoIP) calls and the uplink service flow is substantially in accordance with an Institute of Electrical and Electronic Engineers (IEEE) 802.16 standard. The apparatus also includes a call session module coupled to the connect control module and adapted to generate a connection request message for a VoIP connection. The connect control module, in response to the connection request message, is further adapted to send a dynamic service change request message to activate a call-session bandwidth portion of the reserved bandwidth allocation for the VoIP connection.

30 Claims, 18 Drawing Sheets

U.S. PATENT DOCUMENTS

| | | | |
|---|---|---|---|
| 2006/0159015 A1 | 7/2006 | Seo et al. | |
| 2006/0227747 A1 | 10/2006 | Kim et al. | |
| 2006/0239241 A1* | 10/2006 | Eom et al. | 370/348 |
| 2007/0025279 A1 | 2/2007 | Baek et al. | |
| 2007/0047553 A1* | 3/2007 | Matusz et al. | 370/395.42 |
| 2007/0072604 A1* | 3/2007 | Wang | 455/428 |
| 2007/0097948 A1* | 5/2007 | Boyd et al. | 370/351 |
| 2007/0127499 A1* | 6/2007 | Choi et al. | 370/395.52 |
| 2007/0160017 A1 | 7/2007 | Meier et al. | |
| 2007/0206561 A1 | 9/2007 | Son et al. | |
| 2008/0107084 A1 | 5/2008 | Pichna et al. | |
| 2008/0130531 A1* | 6/2008 | Chou | 370/310 |
| 2008/0175147 A1* | 7/2008 | Lakkakorpi | 370/230 |
| 2008/0183604 A1* | 7/2008 | Chou | 705/30 |
| 2008/0192763 A1* | 8/2008 | Davis et al. | 370/412 |
| 2008/0232267 A1 | 9/2008 | Kim et al. | |
| 2008/0273520 A1 | 11/2008 | Kim et al. | |
| 2008/0311941 A1 | 12/2008 | Yanover | |
| 2009/0040983 A1 | 2/2009 | Kim et al. | |
| 2009/0137254 A1 | 5/2009 | Vukovic et al. | |
| 2009/0141677 A1 | 6/2009 | Maas | |

OTHER PUBLICATIONS

Microwave Theory and Techniques Society, Revision of IEEE Standard 802.16-2001, Oct. 1, 2004, pp. 218-228.

Lee et al., "An Enhanced Uplink Scheduling Algorithm Based on Voice Activity for VoIP Services in IEEE 802.16d/e System," IEEE Communications Letters, vol. 9, No. 8, Aug. 2005, pp. 691-693.

Chen et al., "Providing Integrated Qos Control IEEE 802.16 Broadband Wireless Access Systems," IEEE 2005, pp. 1254-1258.

IEEE Computer Society, IEEE Standard for Local and metropolitan area networks, Part 16: Air Interface for Fixed Broadband Wireless Access Systems, Oct. 1, 2004.

U.S. Appl. No. 11/633,705 Non-Final Office Action mailed May 12, 2009, 16 pages.

U.S. Appl. No. 11/633,705 Non-Final Office Action mailed Sep. 29, 2009, 14 pages.

Microwave, Theory and Techniques Society, Revision of IEEE Standard 802.16-2001, Oct. 1, 2004, pp. 218-228.

* cited by examiner

METHOD AND APPARATUS TO SUPPORT VOIP CALLS IN AN IEEE 802.16 INTERFACE

BACKGROUND

1. Technical Field

Embodiments of the present invention are related to the field of electronic devices, and in particular, to communication devices.

2. Description of Related Art

A broadband wireless access (BWA) system provides a point-to-multipoint communication system in a communications network. BWA systems typically use microwave and millimeter wave technology to transmit communication signals from a wireless base station (BS) to one or more subscriber stations (SS). A BWA system may transmit various types of digital signals including video, voice, television, Internet and other data signals.

An 802.16 family of standards were developed by the Institute of Electrical and Electronic Engineers (IEEE) to provide for fixed, portable, and/or mobile BWA networks (e.g., the IEEE std. 802.16, published 2004 and subsequent revisions). The Worldwide Interoperability for Microwave Access (WiMAX) forum facilitates the deployment of broadband wireless networks based on the IEEE 802.16 standard. In particular, the WiMAX forum ensures the compatibility and inter-operability of broadband wireless equipment. For convenience, the terms "802.16" and "WiMAX" may be used interchangeably throughout this disclosure to refer to the IEEE 802.16 suite of air interface standards.

WiMAX networks may be converged wireless network designed to provide voice, video, and data services. A significant benefit of the converged wireless networks, such as a WiMAX network, is in the sharing of the most valuable resources—the wireless spectrum among different services. However, the wireless network convergence in a WiMAX network also comes with some challenges, due to its point-to-multiple-point topology. Downlink traffic broadcast to all SSs (clients) from BS is not much of an issue. The challenges lie in the arbitration of uplink transmission between multiple SSs, as well as the allocation of uplink bandwidth with Quality of Service (QoS) needed for different services.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention. The term "coupled" shall encompass a direct connection, an indirect connection or an indirect communication.

Figure 1:
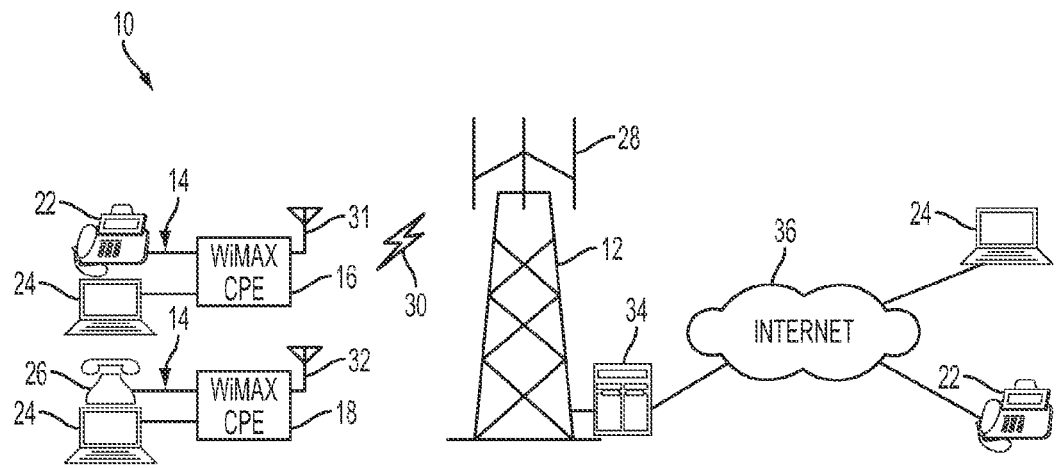
FIG. 1 is an illustrative drawing of a BWA system, according to the various embodiments of the present invention.

With reference to FIG. 1, an illustrative Broadband Wireless Access (BWA) system 10 is shown, according to the various embodiments of the present invention. The BWA system 10 may use wireless cells to cover geographic areas. The BWA system 10 may include a base station (BS) 12 at a central site location transmitting to a plurality of subscriber stations (SS) 14 at remote site locations, with each SS 14 having Customer Premise equipment (CPE). Generally, the BWA system 10 may be illustrated two kinds of CPEs 16 and 18. However, depending upon the implementation, both kinds of CPEs 16 and 18 may be present in the BWA 10. A given SS 14 may include either CPE 16 or 18. Additionally, although only one CPE of each type is illustrated, there may be a plurality of either kind of CPE in the BWA system 10. Elements of the BWA system 10 may communicate with each other in accordance with the communication protocol of the IEEE 802.16 standard. In general, this 802.16 standard may define wireless broadband access for fixed and/or mobile SSs (such as SSs 14) in a wireless Metropolitan Area Network (MAN), which may also be referred to as a WiMAX network.

The first kind of CPE 16 may have coupled thereto one or more Internet Protocol (IP) phones 22 (for example, coupled by way of an Ethernet connection of the CPE 16) and, in some embodiments, may also have coupled thereto one or more computing devices 24, such as a personal computer. In some embodiments, each IP phone 22 may include a Session Initiation Protocol (SIP) user agent (not shown). The second kind of CPE 18 may have coupled thereto one or more analog phones 26 (for example, coupled by way of a RJ11 interface of the CPE 18) and, in some embodiments, also may have coupled thereto one or more of the computing devices 24, such as a personal computer. The IP phones 22 and analog phones 26 result in Voice over Internet Protocol (VoIP) calls. SIP is an application-layer control (signaling) protocol for creating, modifying, and terminating sessions with one or more IP phones 22 (see Request For Comments (RFC) 3261 specification from the Internet Engineering Task Force (IETF) SIP Working Group. However, protocols other than SIP may be used for VoIP call sessions.

The BS 12 may have a receive/transmit antenna 28 to receive wireless communication signals via a wireless transmission medium 30 from the SSs 14 and to transmit wireless communication signals to the SSs 14. The CPEs 16 and 18 may include antennas 31 and 32, respectively. The antennas 31 and 32 may receive and transmit a wireless communication signal from and to the BS 12. The BS 12 may collect traffic to and from the SSs 14 within a cell. The BS 12 may include equipment 34 (including BS uplink scheduler) having an interface to a wired or wireless backbone network 36, such as the Internet; thereby providing a link between a given SS 14 and the backbone network 36. In turn, the backbone network 36 may have a number of devices coupled to it, as illustrated by the IP phone 22 and the computing device 24.

The CPEs 16 and 18, according to various embodiments of the present invention, are directed toward supporting VoIP. More specifically, the CPEs 16 and 18 are configured to transport VoIP traffic originating from the IP phones 22 or analog phones 26 over a connection with differentiated Quality of Service (QoS) tailored for voice services. The various embodiments of the present invention deploy VoIP over WiMAX by using a two-phase call control procedure that may be implemented in the CPEs 16 and 18, as will be described hereinafter, after a description of the relevant portions of the IEEE 802.16 standard.

IEEE 802.16 defines a "service flow" as a Media Access Control (MAC) transport service that provides unidirectional transport of packets, either uplink packets transmitted by the SS or downlink packets transmitted by the BS. A service flow is characterized by a set of QoS Parameters, such as latency, jitter, and throughput assurances. The BS provides a given QoS according to the QoS Parameter Set defined for the service flow. Generally, a service flow, as described in the IEEE 802.16 standard, may have three states (each service flow can transition to any of the three states): (a) Provisioned—this state of service flow is known via provisioning by, for example, a network management system; (b) Admitted—this state of service flow has resources reserved by the BS for the SS; and (c) Active—this state of service flow has resources committed by the BS for the SS. IEEE 802.16 includes a parameter QoS Parameter Set Type ("Set Type") within each service flow encoding which specifies the proper application of the QoS Parameter Set: to the Provisioned Set, the Admitted Set, and/or the Active Set. The 802.16 standard proposes a two-phase Activation Model, wherein resources, such as bandwidth, are first "admitted" and then once the end-to-end negotiations are completed, the resources are "activated".

IEEE 802.16 defines a DSA (Dynamic Service Addition) message and a DSD (Dynamic Service Deletion) message that may be used to create or delete service flows dynamically, as VoIP calls are set-up or torn-down, respectively. However, using DSA/DSD for reserving bandwidth for one or more VoIP calls has the following issues: (a) To prevent a subscriber from using the service for which the subscriber is not authorized, each DSA request needs to forward to authorization server for authorization. It may add significant overhead and delay to each VoIP call setup. (b) Two Service Flow Identifiers (SFIDs) need to be assigned and released for each VoIP call, which may add extra overhead and complexity in the SFID management across BSs. It also means that two SSs can use the same SFID, which may cause confusion in account management, since the accounting records are based on SFIDs. (c) Since the BS cannot predict how many DSA/DSD messages will be sent from subscribers for VoIP calls, BS overall bandwidth may not be distributed optimally for different services, which may result in VoIP call rejection or bandwidth waste. (d) It also may add overhead to BS scheduler to process DSA/DSD messages on per call basis. As will be described hereinafter, the CPEs 16 and 18, according to various embodiments of the present invention, take another approach, the two-phase call control procedure, as well be discussed hereinafter.

IEEE 802.16 (WiMAX) also defines uplink scheduling services using bandwidth request/grant process to differentiate QoS requirements. The following are service classes of IEEE 802.16 for various services: Unsolicited Grant Services (UGS); Real-Time Polling Services (rtPS); Non-Real-Time Polling Services (nrtPS); and Best Effort Services (BE). Each service class includes a grouping of service flow properties or attributes (including QoS parameters) used by the SS or BS to request service flows with desired QoS. UGS is designed to support constant bit rate (CBR) or CBR like service flows, such as T1/E1 emulation, and VoIP without silence suppression. In other words, UGS is tailored for carrying services that generate fixed units of data periodically. Consequently, the BS schedules regularly, in a preemptive manner, reserved bandwidth allocations (bandwidth grants), without an explicit bandwidth request from the SS. Real-Time Polling Services (rtPS) is designed to support real-time service flows that generate variable size data packets on a periodic basis, such as MPEG video. SSs are polled frequently enough to meet the real-time requirement of service flows. UGS or rtPS may be used with the CPEs, according to various embodiments of the present invention, with UGS being referred to in some of the embodiments. Generally, Non-Real-Time Polling Services (nrtPS) and Best Effort Services (BE) are not suited for VoIP calls.

Figure 2:
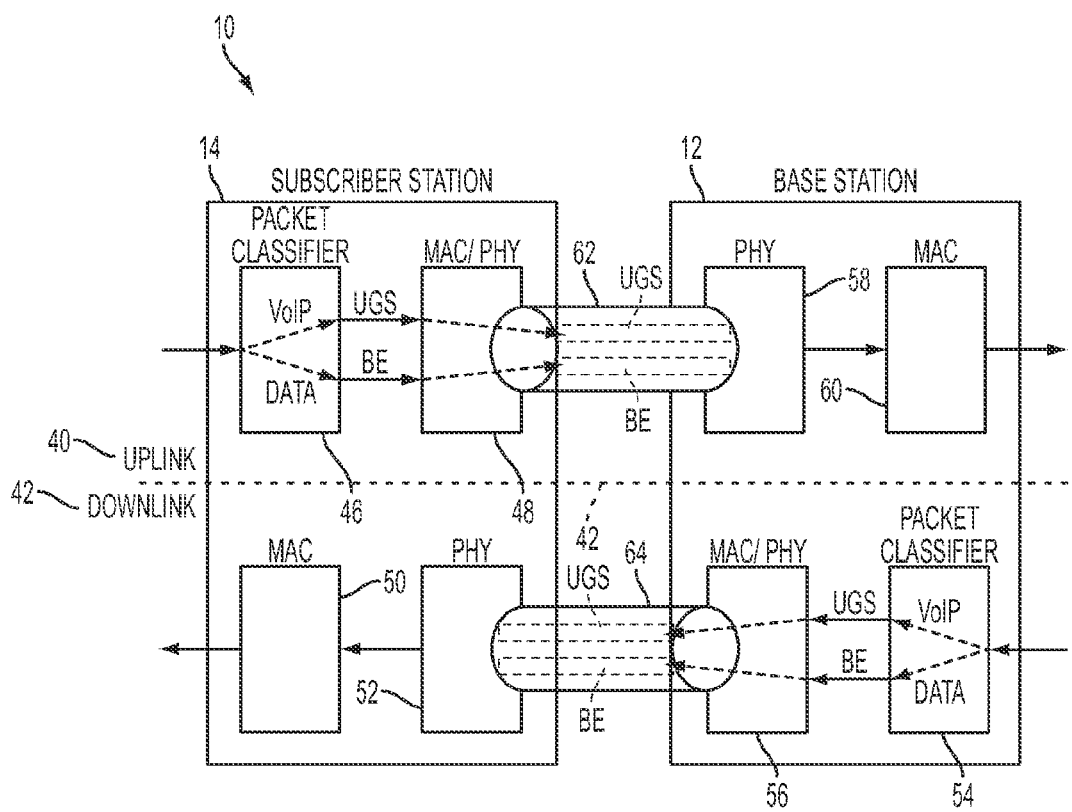
FIG. 2 is a block diagram of the BWA system, according to the various embodiments of the present invention.

Referring to FIG. 2, an overview block schematic diagram is shown which is representative of the BS 12 and one of the SSs 14 of the BWA system shown in FIG. 1, in accordance with various embodiments of the present invention. The BS 12 and SS 14 conceptually are divided into an uplink portion 40 and a downlink portion 42 by an imaginary line 44. Functional units of the BS 12 and SS 14 may conform to the layers of the Opens Systems Interconnect (OSI) model, including the media access control (MAC) layer and the physical (PHY) layer, with the layers being divided into uplink and downlink portions. Hence, the SS 14 may be illustrated with a packet classifier 46 coupled to uplink MAC/PHY layer portions 48 and a downlink MAC 50/PHY layer portions 52. Likewise, the BS 12 may be illustrated with a packet classifier 54 coupled to downlink MAC/PHY layer portions 56 and an uplink PHY layer portion 58 and MAC layer portion 60. A conceptual transmission pipe 62 is illustrated between the uplink MAC/PHY layers 48 of the SS 14 and the uplink PHY layer portion 58 of the BS 12, with this pipe being illustrated with an uplink UGS service flow and an uplink BE service flow. Likewise, a conceptual transmission pipe 64 is illustrated between the downlink MAC/PHY layer portions 56 of the BS 12 and the downlink PHY layer portion 52 of the SS 14, with this pipe being illustrated with a downlink UGS service flow and a downlink BE service flow. The SS 14 may be either the CPE 16 or 18 of FIG. 1. The packet classifier 46 in the SS 14 may classify and route the uplink VoIP packets to the uplink UGS service flow toward the BS 12, while the packet classifier 54 in the BS 12 may classify and route the downlink VoIP packets to the downstream UGS service flow toward the SS 14. Classifiers use rules, such as destination IP/Port address, QoS attributes (e.g. Tos (Type of Service), DSCP (Differentiated Service Code Point)) to classify the packets. There may be multiple classification rules for a service flow, so multiple IP connections may be routed to the same service flow.

The SS 14 utilizes the two-phase call control procedure, which includes Phase I for bandwidth reservation and Phase II for bandwidth activation. Prior to Phase I, there may be a provisioning of a service flow. During provisioning, the service flow is instantiated and its Provisioned QoSParamSet may be set to included a provisioned bandwidth that may be subsequently reserved during Phase I, as will be described hereinafter. As one possibility, the amount of the provisioned bandwidth may be set by a network management system (not shown). The provisioned bandwidth may be negotiated between the BS 12 and the SS 14 prior to or during connection setup. The provisioned bandwidth may be set for some number of phones, with this number of phones not being limited to one. For example, 200 Kbps may be set for the provisioned bandwidth for a given SS 14 which may want to undertake two VoIP calls simultaneously, assuming 100 Kbps per VoIP call. In this example, even though the SS 14 may connect more than two IP or analog phones 22 or 26 to the CPE 16 or 18, respectively, at most there may be only two active calls at any given time during the Phase II bandwidth activation to be described hereinafter. Statistically, at the SS 14, not all VoIP calls may be active at the same time, so the SS 14, with respect its VoIP users, may be able to under subscribe with respect to setting the provisioned bandwidth with the BS 12 without significant reductions in performance.

For bandwidth reservations of Phase I, the BS 12 may provide "reserved bandwidth allocations" to the SSs 14 for VoIP service flows, with such SSs 14 having previously established provisioned service flows. Due to constraints on the BS 12, the reserved bandwidth allocation in some cases may be less than the provisioned bandwidth. In any case, due to the prior establishment of the provisioned bandwidth, the BS 12 knows in advance the amount of the desired reserved bandwidth allocation to be provided to a given SS 14, if not subject to any BS constraints. For bandwidth activation of Phase II, the uplink/downlink (UL/DL) UGS service flows are activated for at least one VoIP call. Assuming the reserved bandwidth allocation in Phase I was for more than one VoIP call, then more than one active VoIP call (i.e., a plurality of VoIP calls) may share the same UGS service flow. In some embodiments, each VoIP call included in the UGS service flow may be activated and deactivated separately.

In the two-phase call control procedure, a single reserved bandwidth allocation for a plurality of VoIP calls may be granted for a service flow, without having to grant multiple reserved bandwidth allocations for a service flow in response to multiple DSA messages. Likewise, there are not multiple DSD messages requesting deactivation of reserved bandwidth allocations for one or more VoIP calls. This may reduce connection setup overhead of the BS scheduler. Additionally, improved bandwidth efficiency may be achieved without impacting VoIP quality by the BS 12 being able to allocate bandwidth for voice services in advance, avoiding the issue of not know how many voice calls will be initiated/removed in a given DSA/DSD message. Hence, bandwidth waste and poor voice services may be reduced. Additionally, the CPEs 16 and 18 may work with any IP phone and any analog phone, respectively. The two-phase call control procedure does not require changes to MAC layer or PHY layer of the CPEs 16 and 18, since it may be implemented in the application space. Additionally, since the two-phase call control procedure is implemented in the CPEs 16 and 18, it may be transparent to the BS 12. Therefore, the inclusion of the two-phase call control procedure may create a value added service for the CPE 16 or 18 without causing any interoperability issue with the BS 12. No modifications of the 802.16 standard are needed to implement the two-phase call control procedure. Additionally, inclusion of the two-phase call control procedure in the CPE 16 or 18 may provide support for a Vonage usage model over WiMAX.

Figure 3:
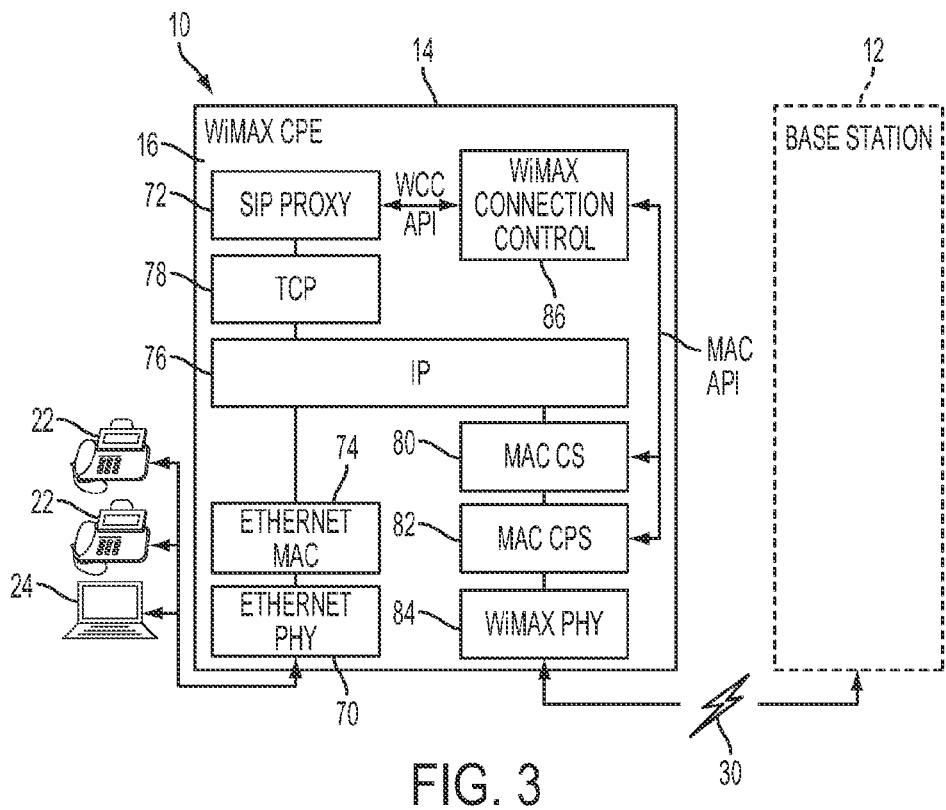
FIG. 3 is a block diagram of the BWA system having IP phones coupled to a CPE, according to one embodiment of the present invention.
Figure 4:
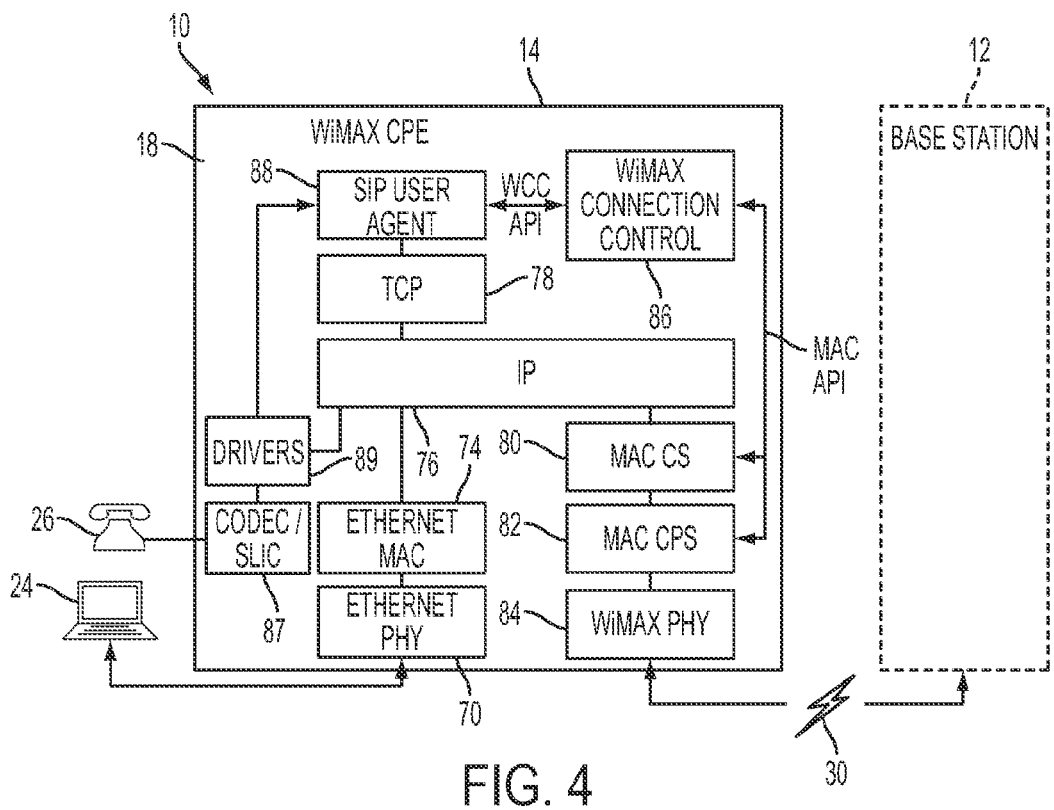
FIG. 4 is a block diagram of the BWA system having analog phones coupled to a CPE, according to one embodiment of the present invention.

Referring to FIGS. 3 and 4, the SS 14 is shown in a more detailed manner, but with just the VoIP call connections being shown (no packet classifier). FIG. 3 shows the CPE 16 of FIG. 1 in more detail and FIG. 4 shows the CPE 18 of FIG. 1 in more detail. Referring to FIG. 3, according to one embodiment of the present invention, the SS 14 takes the form of the CPE 16, which is shown coupled to two IP phones 22 and one computer 24. The various OSI layers of the CPE 16 are shown in more detail in FIG. 3 than in FIG. 4 (but are not divided into uplink and downlink portions, as undertaken FIG. 3), with such layers being configured for IP phones 22. In some embodiments, the phones 22 and computer 24 may be coupled to an Ethernet PHY layer 70, which in turn is coupled to a "call session module", in the form of a Session Initiation Protocol (SIP) proxy 72, through an Ethernet MAC layer 74, an Internet Protocol (IP) layer 76, and a Transmission Control Protocol (TCP) layer 78. Also, in some embodiments, the IP layer 76 may be coupled to the BS 12 through a MAC CS (Convergence Sublayer) 80, a MAC CPS (Common Part Sublayer) 82, a WiMAX PHY layer 84, and the wireless medium 30. A connect control module, such as a WiMAX Connect Control (WCC) module 86, is included in the CPE 16 and includes a WCC Application Programming Interface (API) that interfaces with the call-session module (SIP proxy 72) and a MAC API that interfaces with the MAC CS 80 and the MAC CPS 82. The architecture of the CPE 16 of FIG. 3 provides support for IP phones 22. The WCC module 86 is responsible for mapping the VoIP streaming with a WiMAX service flow. The SIP proxy 72 may play both a server role and a client role. When acting as a SIP server, SIP proxy 72 receives SIP messages from one of the IP phones 22. The SIP proxy 72, acting as a SIP client, then forwards the SIP messages to the network on behalf of the IP phone 22. The voice streaming packets may be routed from Ethernet MAC layer 74 to the WiMAX service flows that are set up by the WCC module 86 through the IP layer 76.

Referring to FIG. 4, according to one embodiment of the present invention, the SS 14 takes the form of the CPE 18, which is shown coupled to one analog phone 26 (may be more than one) and one computer 24. Many of the components of FIG. 4 are the same as FIG. 3; hence, they will retain the same reference numbers and will not be described again. However, CPE 18 includes components to handle an analog phone, which includes a codec (COder-DECoder)/SLIC (Subscriber Line Interface Circuit) combination 87. The codec may provide for coding analog signals from the analog phone 26 into digital signals and decoding digital signals into analog signal going to the analog phone 26. The SLIC may provide loop interface functions including, for example, battery feed, overload protection, supervision, and 2-4 wire hybrid. The codec/SLIC combination 87 may be coupled to a "call session module", in the form of a SIP user agent 88, through drivers 89, which also is coupled to the IP 76. The SIP user agent 88 is coupled to the WCC module 86 via the WCC API and is coupled to the TCP 78. The architecture of the CPE 18 of FIG. 4 supports analog phones 26. The WCC module 86 again is responsible for mapping the VoIP streaming with a WiMAX service flow. SIP user agent 88 may interface with the Codec and SLIC combination 87 for analog phone events, such as on-hook/off-hook detection and ringing activation. The voice streaming packets may be routed from codec to the WiMAX service flows that are set up by the WCC module 86 through the IP layer 76.

With respect to FIGS. 3 and 4, the two API interfaces of the WCC module 86 are defined as follows. The SIP proxy 72 of FIG. 3 and the SIP user agent 88 of FIG. 4 are generically referred to as the "call session module", since the exchanged messages (signals) with the WCC API are the same in FIGS. 3 and 4. Although SIP is used to implement the call session module, other call session protocols may be used. The WCC API of the WCC module 86 in both FIGS. 3 and 4 may enable the SIP application to activate or deactivate WiMAX service flows, using the following messages: (a) wccConnReq—a connection request message from the call session module (SIP proxy 72 of FIG. 3 or SIP user agent 88 of FIG. 4) to connect a VoIP streaming to a WiMAX service flow; (b) wccConnRsp—a connection response message to wccConnReq; (c) wccDiscReq—a disconnection request message from the call session module (SIP proxy 72 of FIG. 3 or SIP user agent 88 of FIG. 4) to disconnect a VoIP streaming to a WiMAX service flow; and (d) wccDiscRsp—a response message to wccDiscReq. The MAC API of the WCC module 86 may use IEEE 802.16 MAC messages to control service flows. In some embodiments, these IEEE 802.16 messages may include:(a) dsaReq (dynamic service addition Request)—DSA-REQ request to create a service flow; (b) dsaRsp (dynamic service addition Response)—DSA-RSP response to DSA-REQ; (c) dscReq (dynamic service change Request)—DSC-REQ request to change service flow attributes; (d) dscRsp (dynamic service change Response)—DSC-RSP response to DSC-REQ; (e) dsdReq (dynamic service deletion Request)—DSD-REQ request to delete a service flow; and (f) dsdRsp (dynamic service deletion Response)—DSD-RSP response to DSD-REQ.

Figure 5:
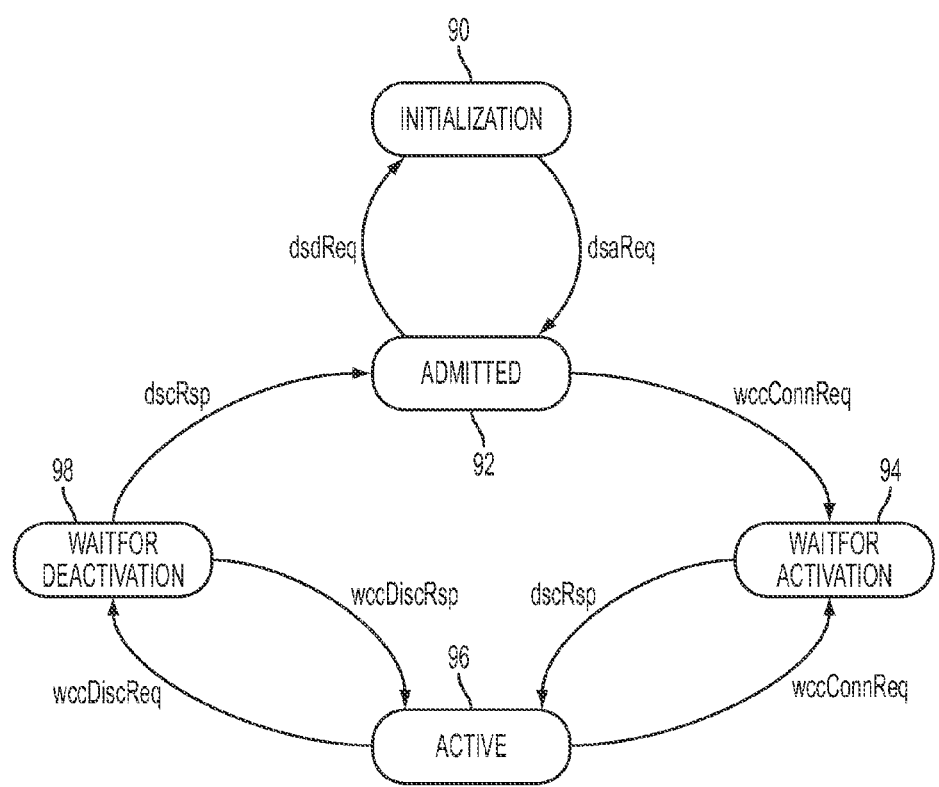
FIG. 5 is a state transition diagram for a connect control module, according to the various embodiments of the present invention.

Referring to FIG. 5, a control state transition diagram is provided for WCC module 86 of FIGS. 3 and 4, according to the various embodiments of the present invention, using the above-described API messages or signals and provides an overview of the diagrams of FIGS. 6-10 to be presented hereinafter. This diagram of FIG. 5 has the following states: (a) Initialization State 90—initial state after power-up or reset; (b) Admitted State 92—resources such as UL/DL service flow, have been reserved (allocated), but not yet activated (i.e. no active VoIP calls); (c) WaitForActivation State 94—waiting for BS response on service flow activation; (d) Active State 96—there is at least one active VoIP call; and (e) WaitForDeactivation State 98—waiting for BS response on service flow deactivation. The Admitted State corresponds to the Phase I of the two-phase call control procedure described above. While in the Initialization State 90, the BS may send to the WCC module a non-solicited dsaReq message requesting that it provide a reserved bandwidth allocation for some number of VoIP calls. Upon responding with a dsaRsp message (not shown) to the BS, the WCC module may transition from the Initialization State 90 to the Admitted State 92. The WCC module may transition from the Admitted State 92 back to the Initialization State 90 when the BS sends the dsdReq message to delete the service flows. Upon receiving a wccConnReq message from the call-session module, the WCC module may send a dscReq message to the BS and may transition from the Admitted State to the WaitForActivation State 94. Upon receiving a dsqRsp message from the BS, the WCC module may transition from the WaitForActivation State 94 to the Active State 96. Active State 96 corresponds to Phase II of the two-phase call control procedure described above in that there now is an Active VoIP call. If another VoIP call is to be added, as indicated by the wccConnReq message extending from the Active State 96 to the WaitForActivation State 94, then for that VoIP call, the WCC module transitions back to the WaitForActivation State 94. When a VoIP call is terminated by the WCC module receiving a wccDiscReq message from the call-session module, then the WCC module may transition from the Active State 96 to the WaitForDeactivation State 98, where the WCC may send a dscReq message to the BS. Upon receiving a dscRsp message from the BS, the WCC may transition to the Admitted State 92.

FIGS. 6 through 10 show various control state logic diagrams for implementing the WCC state diagrams as described in FIG. 5, according to the various embodiments of the present invention. The reference numbers of the States shown in FIG. 5 are used in FIGS. 6-10. Additionally, some parameters used in these diagrams are defined as follows: (a) an "available bandwidth quantity" Bw(XL)—indicates the uplink or downlink bandwidth that are available, is initialized to the bandwidth amount of the reserved bandwidth allocation during the Initialization State; (b) available downlink bandwidth quantity Bw(DL)—indicates the downlink available bandwidth; (c) available uplink bandwidth quantity Bw(UL)—indicates the uplink available bandwidth; (d) an amount of a "call-session bandwidth portion" (requested bandwidth) reqBw—indicates the requested bandwidth needed for a VoIP call, with the call-session bandwidth portion being that portion of the reserved bandwidth allocation needed for the VoIP call; and (e) T7—indicates the wait for DSA/DSC/DSD response timeout.

Figure 6:
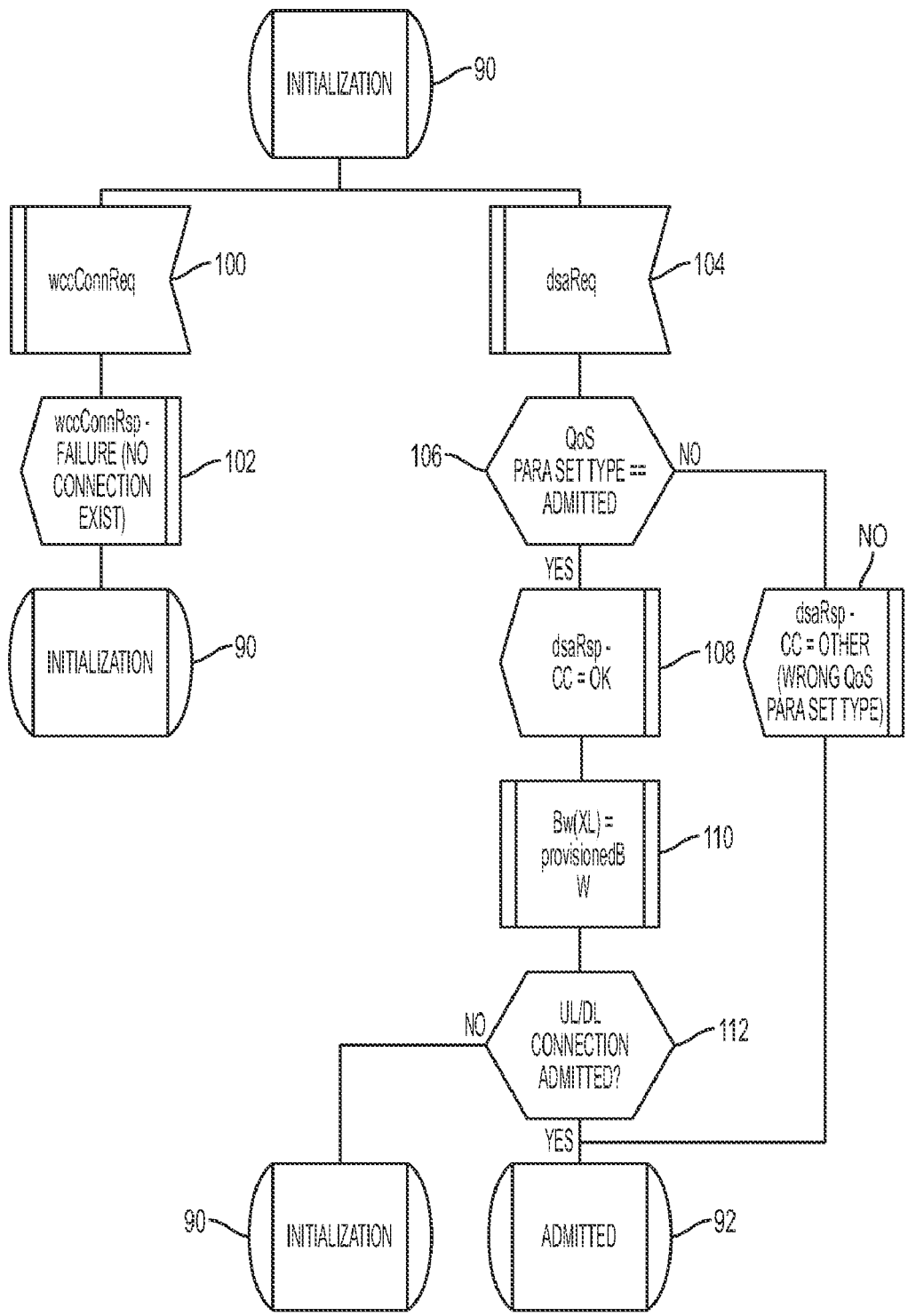
FIG. 6 is a flow chart for the connect control module starting from its Initialization state, according to the various embodiments of the present invention.

Referring to FIG. 6, a procedure of the WiMAX Connection Control (WCC) module 86 of FIGS. 3 and 4, according to the various embodiments of the present invention, is shown in which the WCC module 86 starts in its Initialization State 90 and, after a number of operations, either remains in the Initialization State 90 or transitions to its Admitted State 92. While the WCC module is in its Initialization State 90, if in an operation 100 the WCC module receives a wccConnReq message from the call-session module (SIP Proxy of FIG. 3 or the SIP user agent of FIG. 4) requesting that a VoIP stream be connected to a WiMAX service flow while in its Initialization State 90, then the WCC module 86 in an operation 102 may respond to the call session module with a wccConnRsp message indicating "Failure (no connection exists)" and then continue in the Initialization State 90, as shown by the repeated Initialization state 90. While in the Initialization State 90, the WCC module 86 in an operation 104 may receive a dsaReq message from the BS requesting bandwidth reservation of the service flow for VoIP calls. This BS-initiated dsaReq message have its Set Type parameter set to Admitted Set and, in some embodiments, may use the Service Name Class UGS, with there being a QoS Parameter Set associated with UGS. In some embodiments, the BS-initiated dsaReq may include a bandwidth amounts for the reserved bandwidth allocations, which may be equal to or less than the provisioned bandwidths for uplink (UP) and downlink (DL) connections. In an operation 106, the WCC module may determine whether the Set Type of the SS-initiated dsaReq message is "Admitted". If yes, then in an operation 108, the WCC may send a dsaRsp response message to the BS with a Confirmation Code (CC) parameter set to Okay (OK). Next, in an operation 110, the available bandwidth quantity Bw(XL) may be initialized to the bandwidth amount of the reserved bandwidth allocation. This may be the provisioned bandwidth, if the BS is not constrained in providing the full amount of the provisioned bandwidth. In an operation 112, the WCC module may determine whether the UP/DL connections are each admitted. If yes, then the WCC module may transition to its Admitted State 92 and if no, then the WCC may remain in its Initialized State. In operation 106, if the Set Type is not "Admitted", then in an operation 114 the WCC module may respond with a dsaReq message where the CC is set to indicate "other" (wrong QoS parameter set type) and then may proceed to the Admitted State 92.

Figure 7:
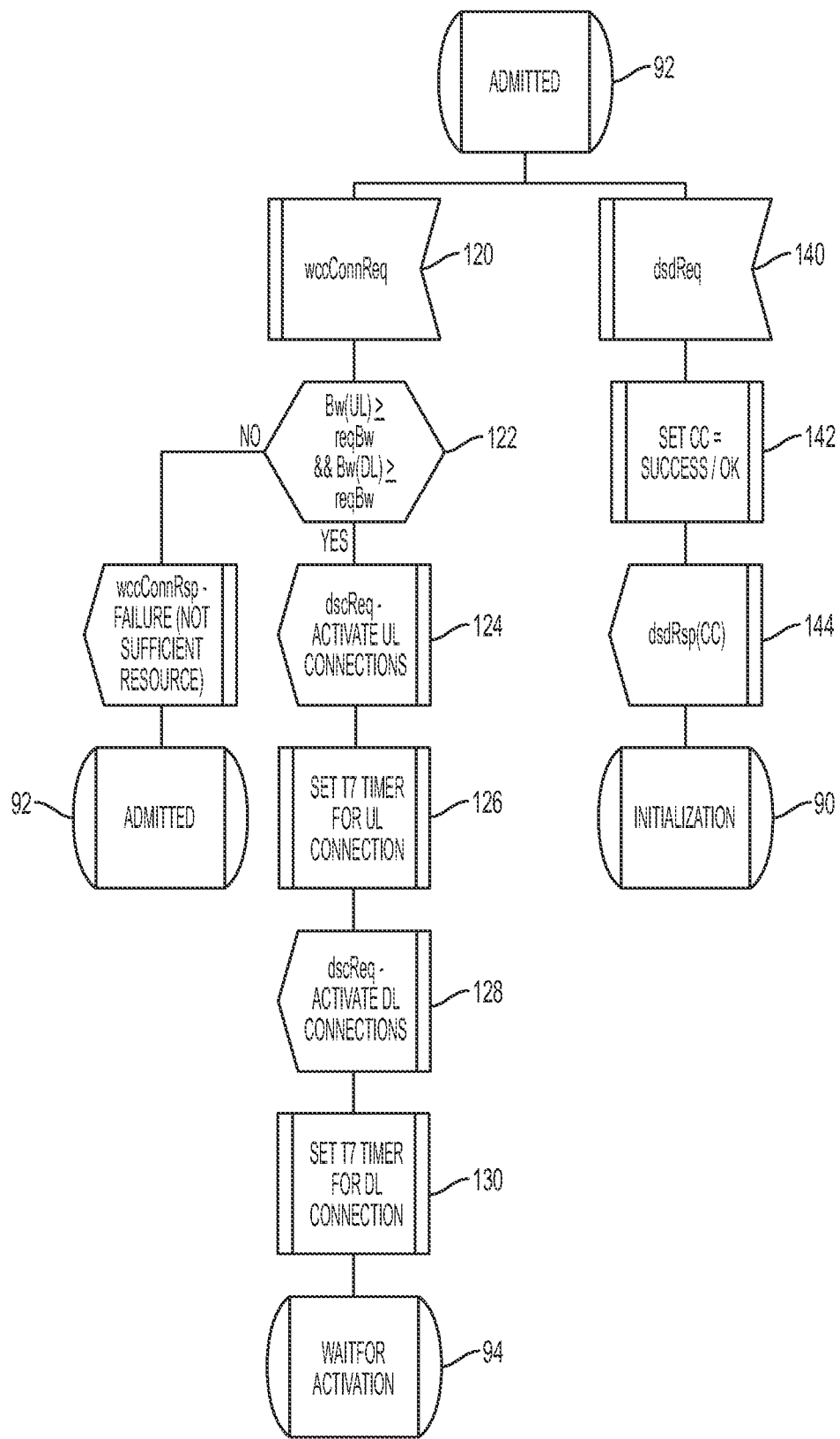
FIG. 7 is a flow chart for the connect control module starting from its Admitted state, according to the various embodiments of the present invention.

With reference to FIG. 7, the WCC module 86 of FIGS. 3 and 4, according to the various embodiments of the present invention, starts in the Admitted State 92. If a wccConnReq message request for an VoIP call is received by the WCC module while in the Admitted State 92 in an operation 120, then in an operation 122 the uplink available bandwidth quantity Bw(UL) may be compared with the amount of the uplink call-session bandwidth (requested bandwidth) reqBw for the VoIP call to determine whether it is equal to or greater than the uplink reqBw and the amount of the available downlink bandwidth Bw(DL) may be compared with the downlink call-session bandwidth (requested bandwidth) reqBw to determine if it is equal to or greater than the downlink reqBw. If yes, then in an operation 124, the WCC module may cause the SS to send a dscReq message to the BS to activate the uplink (UL) connection. Next, in an operation 126, the WCC module may set a T7 timer defined in IEEE 802.16 to define a period of time to receive a dscRsp message from the BS. Likewise, in an operation 128, the WCC module may cause the SS to send a dscReq message to the BS to activate the downlink (DL) connection. Next, in an operation 130, the WCC module may set a T7 timer to define a period of time to receive a dscRsp message from the BS. Thereafter, the WCC module may transition to the WaitForActivation State 94. In operation 122, if the available bandwidth quantities do not exceed the reqBw, the WCC module may proceed to send a wccConnRsp message that indicates "Failure (not sufficient recourse)" for the VoIP phone call. While in the Admitted State 92, in an operation 140 the WCC may receive from the BS a dsdReq message to request the deletion of an Active VoIP call from the BS. In an operation 142, the WCC may set the CC parameter of a dsdRsp message and in an operation 144 the dsdRsp message may be sent to the BS. Then the WCC may transition back to the Initialization State 90.

Figure 8:
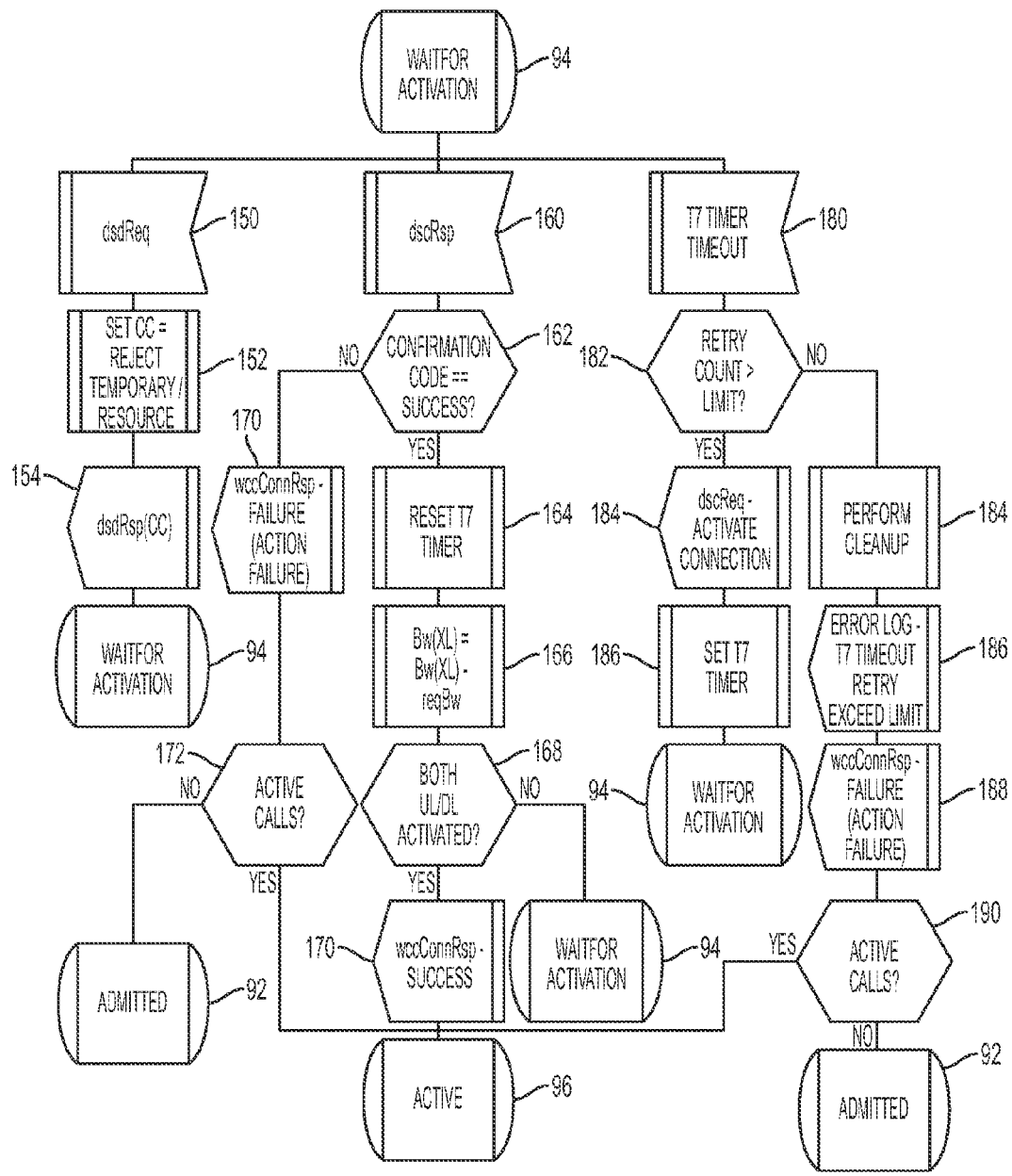
FIG. 8 is a flow chart for the connect control module starting from its WaitForActivation state, according to the various embodiments of the present invention.

Referring to FIG. 8, the WCC module 86 of FIGS. 3 and 4 starts in a WaitForAction State 94. While in this WaitForAction State 94, in an operation 150 the WCC module may receive a dsdReq message from the BS. In an operation 152, the WCC may set the parameter CC to reject in a dsdRsp message and in the operation 154 may send the dsdRsp message to the BS. Thereafter, the WCC module stays in WaitForActivation State 94. While in this WaitForAction State 94, in an operation 160 the WCC module may receive a dscRsp message from the BS in response to the previously sent dscRsp message sent in FIG. 7. In an operation 162, the WCC module may check the CC parameter of the received dsdRsp message to see if it is set to "Success". If yes, in an operation 164, the timer T7 timer may be set and in an operation 166, the Bw(XL) may be reduced by the amount of the session-call bandwidth portion (requested bandwidth) reqBw for the VoIP call. In operation 168, the WCC module may determine whether the downlink and the uplink are activated. If yes, then in operation 170, the WCC module may send a wccConnRsp to the call session module indicating successful activation for the VoIP call and then is in the Active State 96. If "no" in operation 168, then the WCC module may remain in the WaitForActivation State 94. If "no" in the operation 162, then in an operation 170 the WCC module may send a wccConnRsp to the call session module indicating "failure (Action failure)" and then may proceed to an operation 172 where the WCC module may determine if there are any Active Calls. If "yes", then the WCC module is in the Active State 96. If "no", then the WCC module is in the Admitted State. If the T7 timer set in FIG. 7 times out while waiting for the dsdRsp message indicating activation of the desired bandwidth for the VoIP call in an operation 180, then in an operation 182 the WCC module may determine whether a Retry count has not reached a retry limit. If yes, then in an operation 184 the WCC module may repeat its dscReq message to activate a VoIP connection and again may set the T7 timer in an operation 186 and may remain in the WaitForActivation State 94. If "no" in operation 182, then the WCC module may perform clean up procedures in an operation 184. In an operation 186, an error log may be entered stating "T7 timeout retry exceeded limit". In an operation 188 the WCC module next may send a wccConnRsp message to the call session module indicating "Failure (Action Failure)". Next, in an operation 190 the WCC may proceed to see if there are any active calls. If there are any active calls, then the WCC module may proceed to the Admitted State 92. If there are no active calls, then the WCC module may proceed to the Active State 96.

Figure 9:
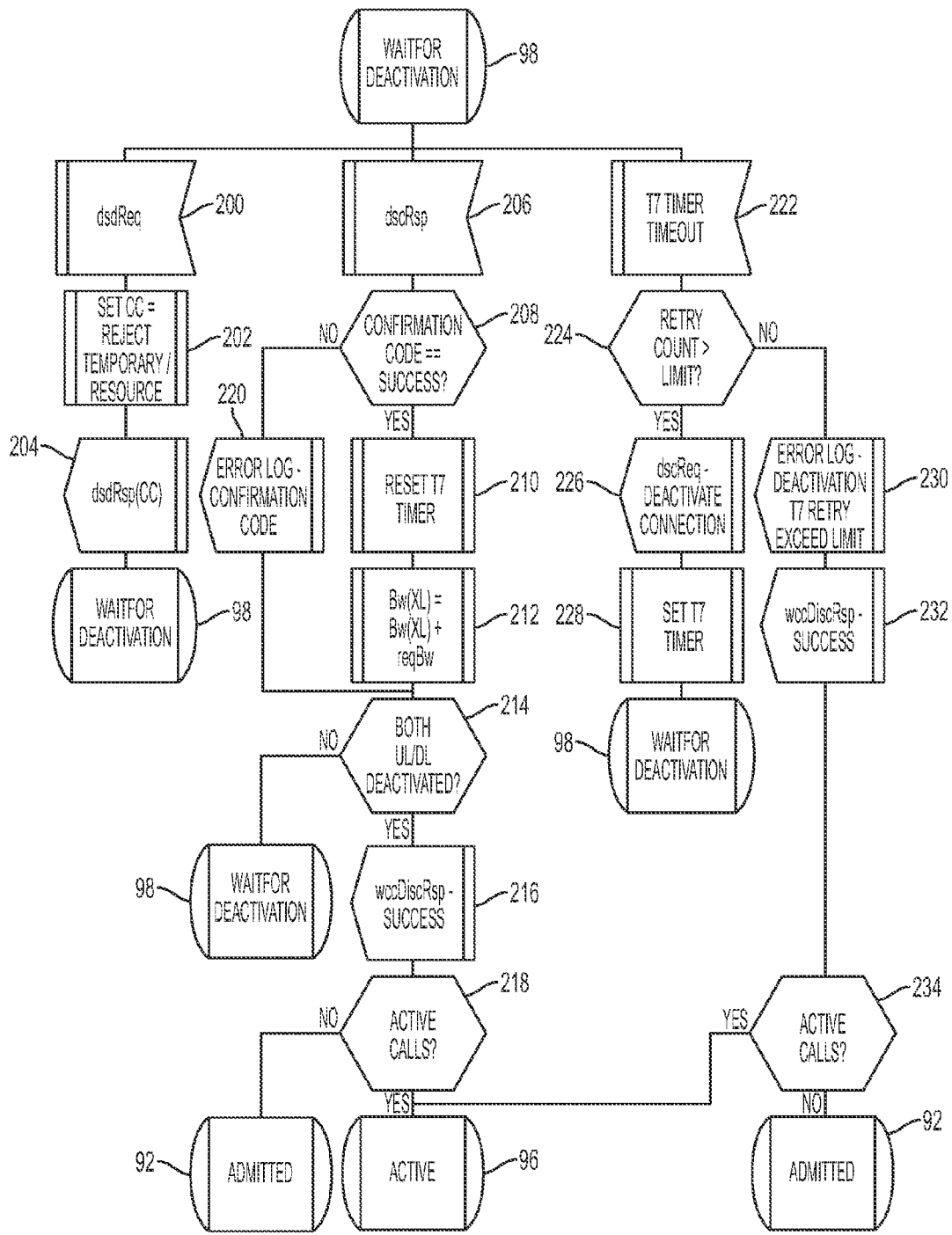
FIG. 9 is a flow chart for the connect control module starting from its WaitForDeactivation state, according to the various embodiments of the present invention.

With respect to FIG. 9, the WCC module 86 of FIGS. 3 and 4, according to the various embodiments of the present invention, starts in the WaitForDeactivation State 98 due to having received a wccDiscReq message from the call session module. While in the WaitForDeactivation State 98, in an operation 200 the WCC module may receive from the BS a dsdReq message requesting deactivation of a service flow when a VoIP call is still active. In an operation 202 the WCC module may respond by setting the CC parameter to "reject" (in the 802.16 standard, the setting is read as "reject temporary/resource") in a dsdRsp message. In an operation 204 the WCC may send the dsdRsp message to the BS and may remain in the WaitForDeactivation State 98. While in the WaitForDeactivation State 98, in an operation 206 the WCC module may receive from the BS a dscRsp message responding to a prior dscReq request message for deactivation. The WCC module in an operation 208 may check the parameter CC of the dscRsp message to see if it was set for "Success" by the BS. If "yes", then in an operation 210 the T7 timer may be reset and in an operation 212 the available bandwidth quantity Bw(XL) may be increased by the reqBw of the deactivated VoIP call. Next, in an operation 214, the WCC module may check and see if both the Uplink and Downlink connections have been deactivated. If "yes", then in an operation 216, the WCC module may send a wccDiscRsp message to the call session module indicating "Success" and in operation 218 may check to see if there are any remaining active calls. If "yes", the WCC may transition to the Active State 96 and if no, the WCC may transition to the Admitted State 92. If "no", in operation 214, the WCC module may remain in the Wait- ForDeactivation State 98. If "no" in the operation 208, then in an operation 220 an error log may be entered for the CC parameter and the WCC module may loop to operation 214. The WCC module may activate the T7 timer prior to sending any dsa/dsc/dsd request messages, which may timeout if the dsa/dsc/dsd response is not processed in time. Hence, while in the WaitForDeactivation State 98, in an operation 222 the WCC module may have a T7 timer timeout while waiting for the dscRsp message from the BS. Then in an operation 224 the WCC module may determine if the number of Retries has not exceeded a set limit and if "yes", then in an operation 226 the dscReq message to deactivate the connection may be retried and in an operation 228 the T7 timer may be set and the WCC module may remain in the WaitForDeactivation State 98. If "no" in operation 224, then in an operation 230 a error log may be made indicating that in attempting deactivation the T7 retries exceeded the set limit, and in operation 232 a wwwDiscRsp signal may be sent to the call session module. Then in operation 234, the WCC module determines whether there are any remaining Active calls, and if "yes", the WCC module may transition to the Active State 96 and if "no" the WCC module may transition to the Admitted State 92.

Figure 10:
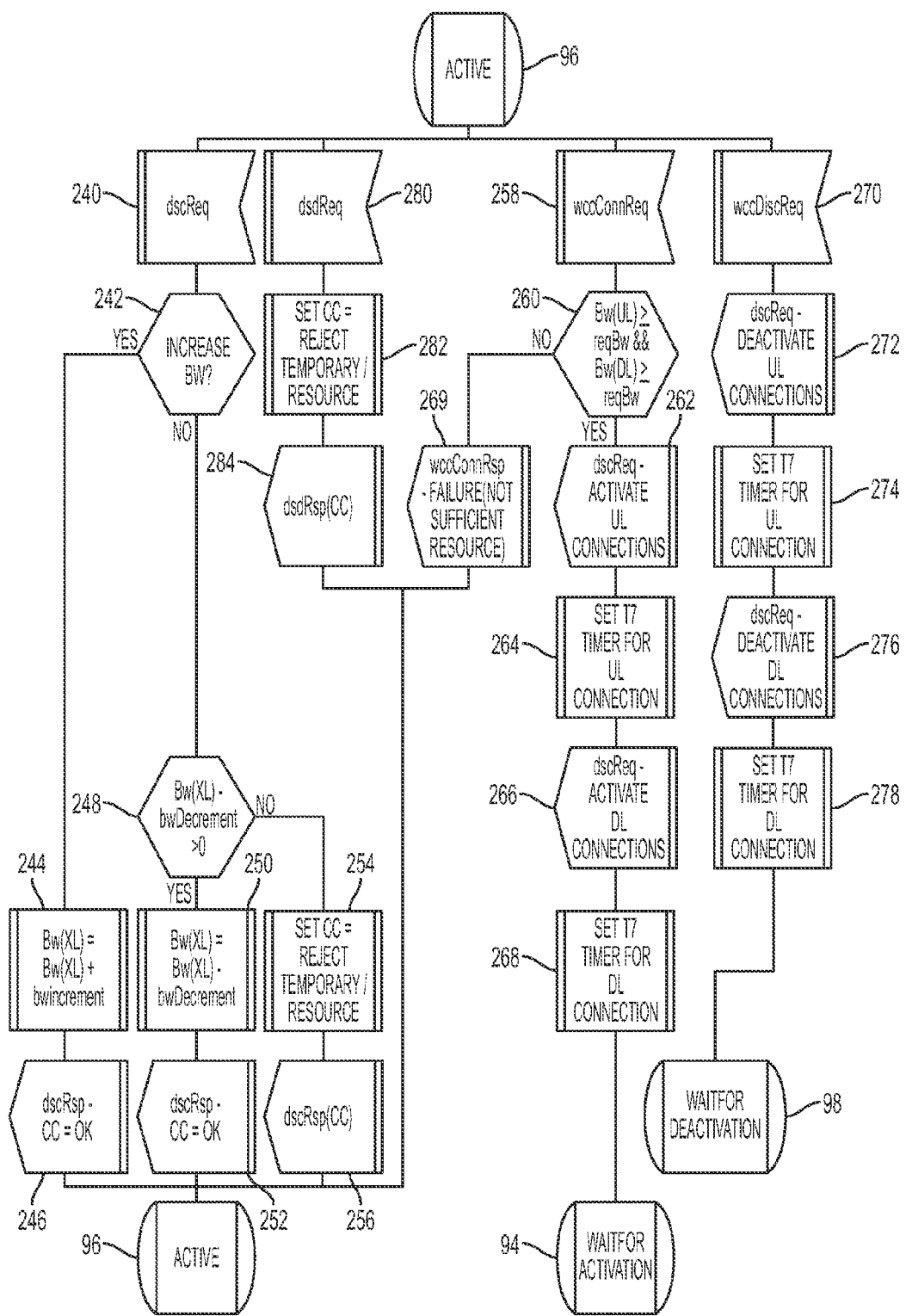
FIG. 10 is a flow chart for the connect control module starting from its Active state, according to the various embodiments of the present invention.

With respect to FIG. 10, the WCC module 86 of FIGS. 3 and 4, according to the various embodiments of the present invention, starts in the Active State 96 due to having received active bandwidth from the BS which is being used for active VoIP calls. The WCC module may want to increase or decrease the available bandwidth quantity BW(XL) by a bandwidth increment of decrement, respectively. For example, the BS may not have provided the entire maximum provisioned bandwidth and may want to increase the reserved bandwidth. Alternatively, the WCC module may have reserved for the SS with the maximum provisioned bandwidth, but, for example, the subscriber agreement may allow for increasing the maximum provisioned bandwidth or decreasing the maximum provisioned bandwidth. Other possibilities may lead to the need and ability to increase the reserved (provisioned) bandwidth allocation. To initiate this, in an operation 240 the WCC module may receive a dscReq message from the SS enquiring as to whether to increase the available bandwidth quantity Bw(XL). In an operation 242, the WCC module asks itself whether to increase or decrease (or keep the same) the bandwidth and if it is an increase, does it want to increase the reserved bandwidth allocation. If there is to be an increase, then in an operation 244 the available bandwidth quantity Bw(XL) is increased by a bandwidth increment (bwIncrement). Then, in an operation 246, the WCC responds to the BS by sending a dscRsp message with the CC parameter set to "Okay", so as to accept the bandwidth increment or decrement. If at operation 242 there is a bandwidth decrement, then in an operation 248 the WCC module may decide whether it wants to decrease the available bandwidth quantity Bw(XL). If yes, then in an operation 250 the available bandwidth quantity Bw(XL) may be decreased by the bandwidth decrement (bwDecrement) and the WCC module may send a dscRsp message to the BS with the parameter CC set to Okay to accept the decrement, with the WCC remaining in the Active State 96. If the WCC module does not want to accept the bandwidth decrement at operation 248 (in effect, wants to keep Bw(XL) the same), then in an operation 254 the WCC module may set the parameter CC in a dscRsp message to reject and in an operation 256 may send the dscRsp response to the BS, with the WCC remaining in its Active State 96. Upon receipt of a wccConnReq message from the call session module for connecting a VoIP call while the WCC module is in its Active State 96 in an operation 258, then in an operation 260 the WCC module checks to see if the available bandwidth quantities Bw(UL) and Bw(DL) are greater than that needed for the amount of the call-session bandwidth needed for the VoIP call (reqBw). If yes, then in an operation 262, the WCC module may generate a dscReq message requesting activation of the UL connection and may send it to the BS. Next, in an operation 264 the WCC module may set the T7 timer for a response from the BS to the dscReq message for the UL connection. Likewise, in an operation 266, the WCC module may generate a dscReq message requesting activation of the DL connection and may send it to the BS. Next, in an operation 268 the WCC module may set the T7 timer for a response from the BS to the dscReq message for the DL connection and transitions to its WaitForActivation State 94. If no to operation 260, then in an operation 269, the WCC module response to the call session module by sending a wccConnRsp message indicating "Failure (not sufficient resource)", with the WCC module remaining in its Active State 96. Upon receipt of a wccDiscReq message from the call session module for a disconnected VoIP call while the WCC module is in its Active State 96 in an operation 270, in an operation 272 the WCC module may send to the BS a dscReq message to disconnect the UL connection bandwidth for the disconnected VoIP call and in an operation 274 may set the T7 timer for receipt of a response to the dscReq message for the UL connection, Likewise, in an operation 276 the WCC module may send to the BS a dscReq message to disconnect the DL connection bandwidth for the disconnected VoIP call and in an operation 278 may set the T7 timer for receipt of a response to the dscReq message for the DL connection, and then may transition to its WaitForDeactivation State 98. While the WCC module is in its Active State 96, in an operation 280, the WCC module may receive a dsdReq message from the BS asking whether the WCC wants to disconnect the service flow. In an operation 282, the WCC module may generate a dsdRsp message with the parameter CC set to "reject" and then in operation 284 the WCC module may send the dsdRsp message to the BS, with the WCC module remaining in its Active State 96.

Figure 11:
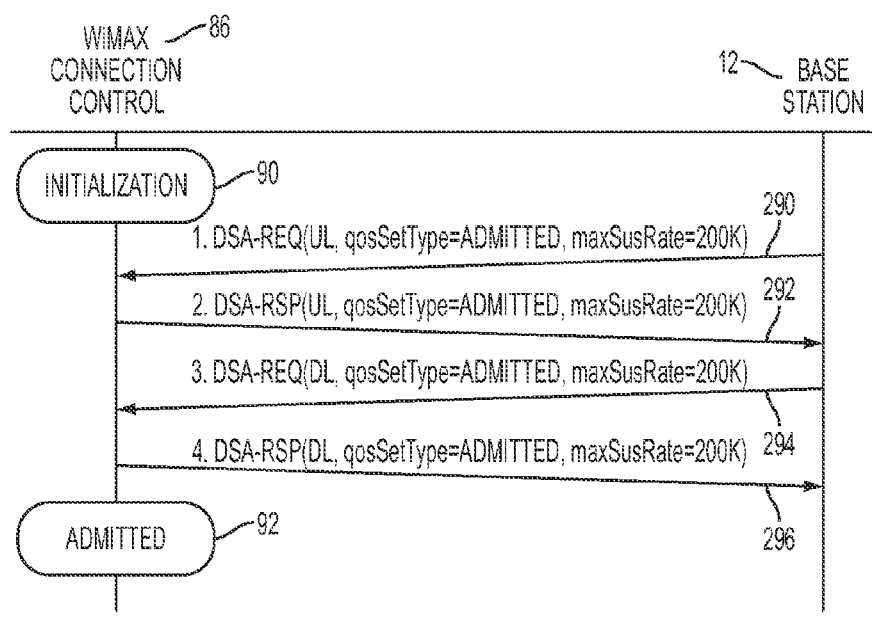
FIG. 11 is a signal diagram for providing a reserved bandwidth allocation to a subscriber station, according to various embodiments of the present invention.

FIG. 11 illustrates the bandwidth reservation scenario in accordance with Phase I of the two-phase call control procedure, according to the various embodiments of the present invention and is relevant to both CPEs 16 and 18 of FIGS. 3 and 4, respectively. In IEEE 802.16, each service flow is unidirectional, so uplink and downlink service flows need to be setup separately. In this example, an illustrative 200 Kbps bandwidth may be reserved that can support two VoIP calls. In particular, this shows providing reserved bandwidth allocations for UL/DL UGS service flows of FIGS. 3 and 4, wherein the admission requests originate from the BS for allocating the BS's bandwidth so as to reserve the bandwidth for the SS. First, in an operation 290, the BS sends a DSA-REQ (same as dsa-req) message for the UL connection, with the qosSetType (previously defined "Type Set") set to Admitted, and the Maximum Sustainable Rate (maxSusRate) set to 200 kpbs. Second, the WCC 86 responses with a DSA-RSP message accepting this reserved bandwidth allocation in an operation 292, with the Type Set and maxSusRate being the same as the RSA-REQ message. Third, in an operation 294, the BS sends a DSA-REQ (same as dsa-req) message for the DL connection, with the qosSetType (previously defined "Type Set") set to Admitted, and the Maximum Sustainable Rate (maxSusRate) set to 200 kpbs. Fourth, the WCC 86 responses with a DSA-RSP message accepting this reserved bandwidth allocation in an operation 296, with the Type Set and maxSusRate being the same as the RSA-REQ message.

FIGS. 12-15 are directed VoIP over WiMAX Call Scenarios for IP Phones 22 of FIGS. 1 and 3, according to one embodiment of the present invention. The WCC 86 may send a DSC-REQ message to activate UL/DL service flows for a VoIP call. Since this is the 1st VoIP call, the maxSusRate is set to 100 Kbps. If it is the 2nd call, then maxSusRate should be increased by another 100 Kbps. This assumes the call uses a G.711 codec that requires roughly 100 Kbps with all overheads. Each of the IP phones 22 shown in FIGS. 1 and 3 include a SIP user agent 300 (client application), with one of those SIP user agent 300 being illustrated in FIG. 12 as the caller to a callee SIP user Agent 302.

Figure 12:
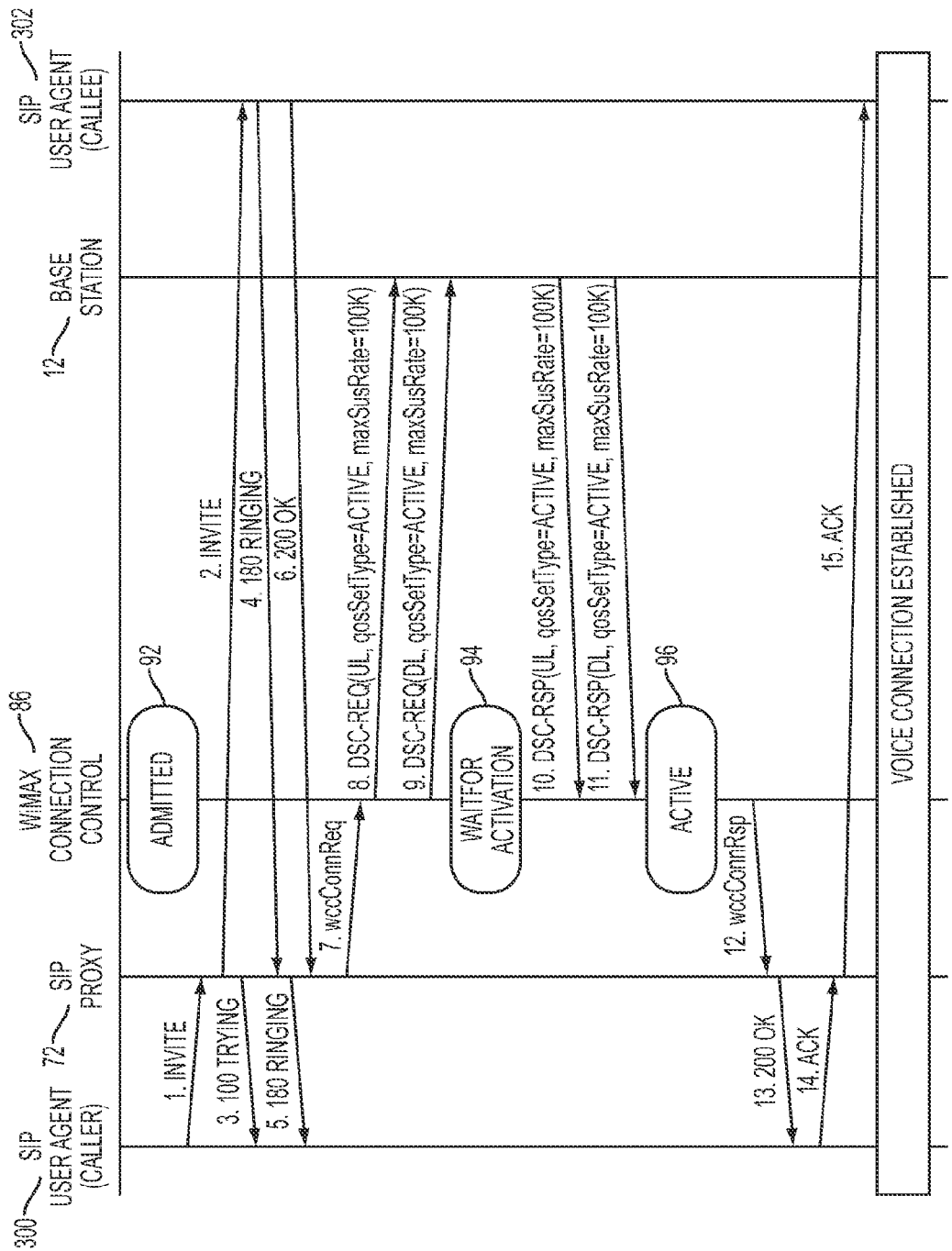
FIG. 12 is a signal diagram for an originating call setup for the CPE of FIG. 3, according to one embodiment of the present invention.

Referring to FIG. 12, an originating call setup scenario is depicted for IP phones 22 of FIGS. 1 and 3. In the Admitted State 92 of the WCC 86, in a first operation, a SIP INVITE message may be transmitted from the caller agent 300 to the SIP proxy 72. In a second operation, the SIP proxy 72 may forward the INVITE to the callee user agent 302. In a third operation, a SIP 100 trying signal may be sent from the SIP proxy 72 to the caller agent 300. In a fourth operation, a SIP 180 ringing signal may be sent from the callee agent 302 to the SIP proxy 72. In a fifth operation, the SIP proxy 72 may pass on the SIP 180 ringing signal to the caller agent 300. In a sixth operation, the callee agent 302 may send a SIP 200 OK to initiate the establishment of a VoIP call. In a seventh operation, in response to the SIP 200 OK, the SIP proxy may send a wccConnReq message to the WCC 86 requesting bandwidth for a VoIP call. In response to the wccConnReq message, in eighth and ninth operations, the WCC 86 may send DSC-REQ messages to the BS 12 for the UL/DL, with the parameter set including qosSetType=active and maxSusRate=100 k, after which the WCC transitions to its WaitForActivation state 94. In the eighth operation, the DSC-REQ may accomplish the following functions for uplink service flow: allocate the bandwidth as shown in maxSusRate parameter and configure the packet classifier 46 of FIG. 2 in the SS 14, so the VoIP packets may be routed to the appropriate UGS service flow. The classification rule used in the configuring of the packet classifier may be based on IP address/port or QoS (Type of service/differentiated services codepoint (DSCP)). In the ninth operation, the DSC-REQ may allocate the bandwidth as shown in the maxSusRate parameter and configure the packet classifier 54 of FIG. 2 in the BS 12, so that the VoIP packets may be routed to the appropriate UGS service flow. In tenth and eleventh operations, the BS may respond with DSC-RSP messages for UL and DL, respectively, with the qosSetType set to active and maxSusRate=100 k, with the WCC transitioning to its Active State 96. In a twelfth operation, the WCC 86 may send a wccConnRsp message to the SIP proxy 72. In a thirteenth operation, the SIP proxy 72 may send a SIP 200 OK signal to the caller agent 300. In a fourteenth operation, the caller agent 300 may send an SIP acknowledgment (ACK) to the SIP proxy and in a fifteenth operation, the SIP proxy 72 may send the ACK to the callee agent 302, after which a voice connection is established.

Figure 13:
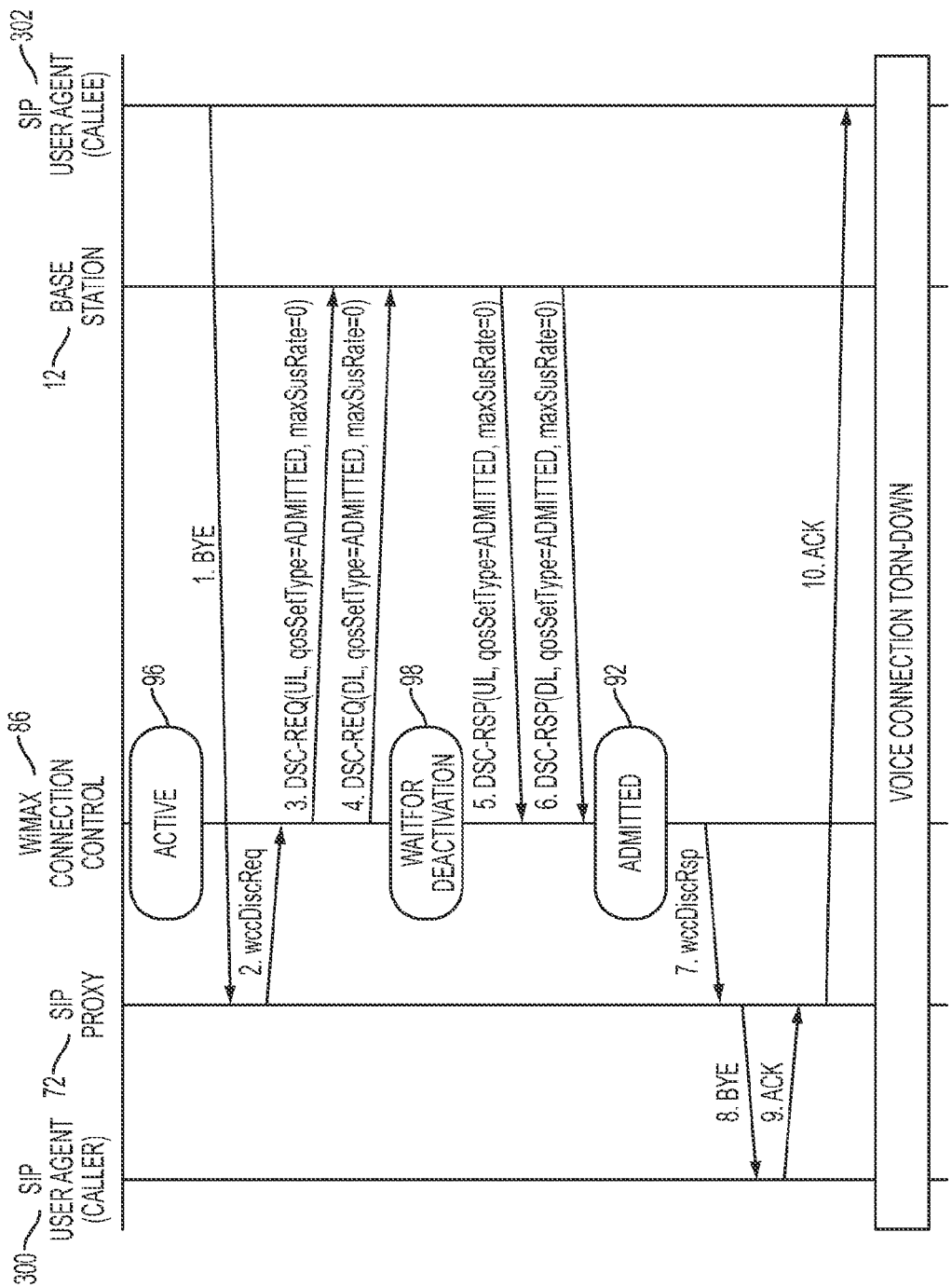
FIG. 13 is a signal diagram for an originating call tear-down for the CPE of FIG. 3, according to one embodiment of the present invention.

FIG. 13 shows the originating call tear-down scenario for IP phones 22 of FIGS. 1 and 3. In a first operation, the callee agent 302 may send a SIP BYE message to the SIP proxy 72. In a second operation the SIP proxy 72 may responds by sending a wccDiscReq to the WCC 86 message to deactivate UL/DL service flows for a VoIP call. In third and fourth operations, the WCC 86 may respond to the wccDiscReq message by sending DSC-REQ messages for the UL and DL. Since this is the 1st VoIP call, the maxSusRate may be set to 0. If it is not the 1 st VoIP call, then maxSusRate may be decrement by 100 Kbps. After the sending of the DSC-REQs, the WCC 86 transitions to its WaitForActivation state 94. In fifth and sixth operations, the BS 12 may respond to the DSC-REQs by sending DSC-RSPs for the UL and DL, with maxSusRate=0. The WCC 86 responds by transitioning to its Admitted State 92 and in a seventh operation, may send wccDiscRsp to the SIP proxy 72. In an eighth operation, the SIP proxy may respond by sending a SIP BYE message to the caller agent 300, which in a ninth operation may send an ACK to the SIP proxy 72. In a tenth operation, the SIP proxy 72 may send the ACK on to the callee agent 302, which leads to the voice connection being torn down.

Figure 14:
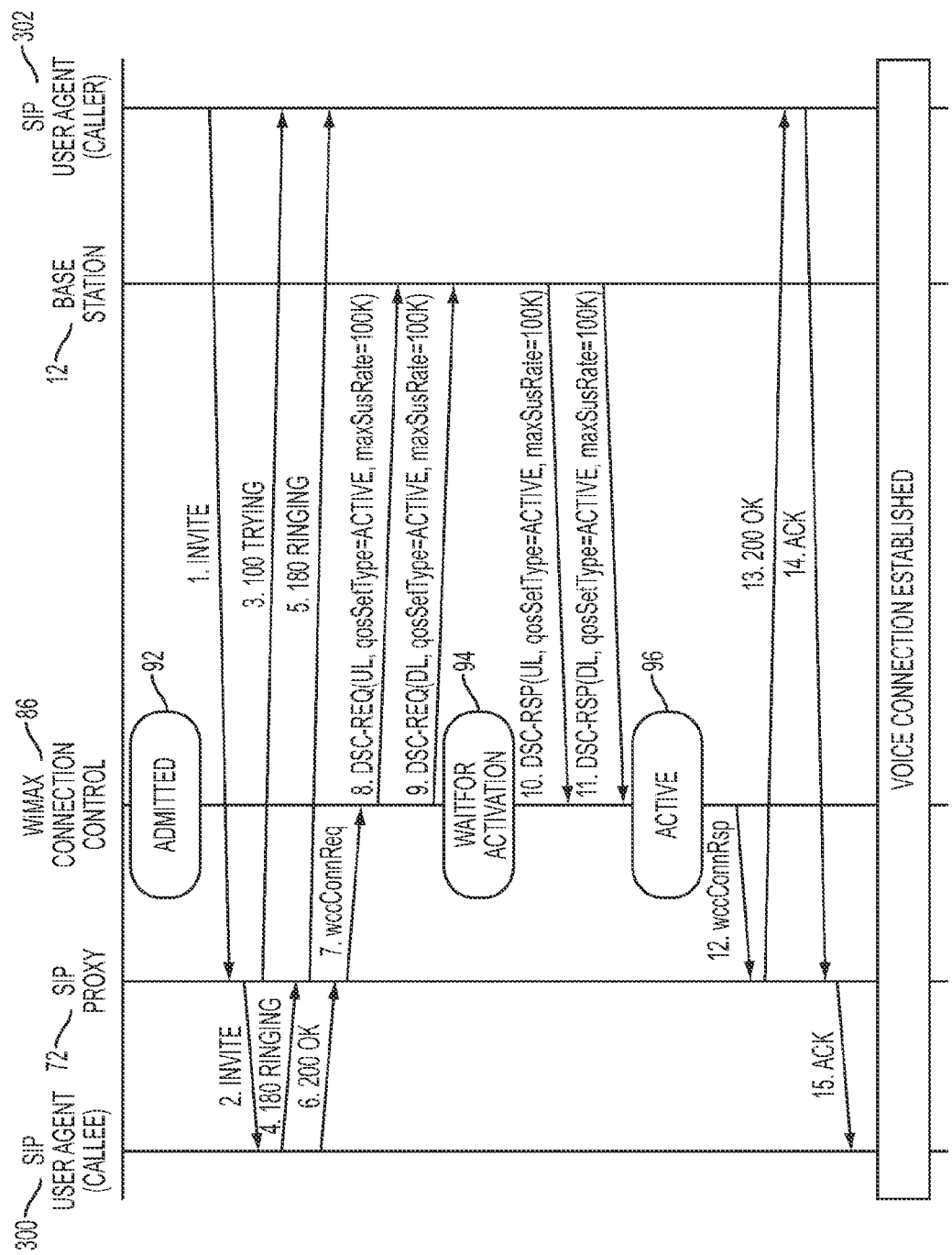
FIG. 14 is a signal diagram for a terminating call setup for the CPE of FIG. 3, according to one embodiment of the present invention.

FIG. 14 describes the terminating call setup scenario for IP phones 22 of FIGS. 1 and 3. In the Admitted State 92 of the WCC 86, in a first operation, a SIP INVITE message may be transmitted from the caller agent 302 to the SIP proxy 72. In a second operation, the SIP proxy 72 may forward the INVITE to the callee user agent 300. In a third operation, a SIP 100 trying signal may be sent from the SIP proxy 72 to the caller agent 302. In a fourth operation, a SIP 180 ringing signal may be sent from the callee agent 300 to the SIP proxy 72. In a fifth operation, the SIP proxy 72 may pass on the SIP 180 ringing signal to the caller agent 302. In a sixth operation, the callee agent 300 may send a SIP 200 OK to the SIP proxy 72. In a seventh operation, in response to the SIP 200 OK, the SIP proxy may send a wccConnReq message to the WCC 86 requesting bandwidth for a VoIP call. In response to the wccConnReq message, in eighth and ninth operations, the WCC 86 may send DSC-REQ messages to the BS 12 for the UL/DL, with the parameter set including qosSetType=active and maxSusRate=100 k, after which the WCC transitions to its WaitForActivation state 94. In a tenth and eleventh operations, the BS may respond with DSC-RSP messages for UL and DL, respectively, with the qosSetType set to active and maxSusRate=100 k and with the WCC transitioning to its Active State 96. In a twelfth operation, the WCC 86 may send a wccConnRsp message to the SIP proxy 72. In a thirteenth operation, the SIP proxy 72 may send a SIP 200 OK signal to the caller agent 302. In a fourteenth operation, the caller agent 302 may send an SIP acknowledgment (ACK) to the SIP proxy 72 and in a fifteenth operation and the SIP proxy 72 may send the ACK to the callee agent 300, after which a voice connection is established.

Figure 15:
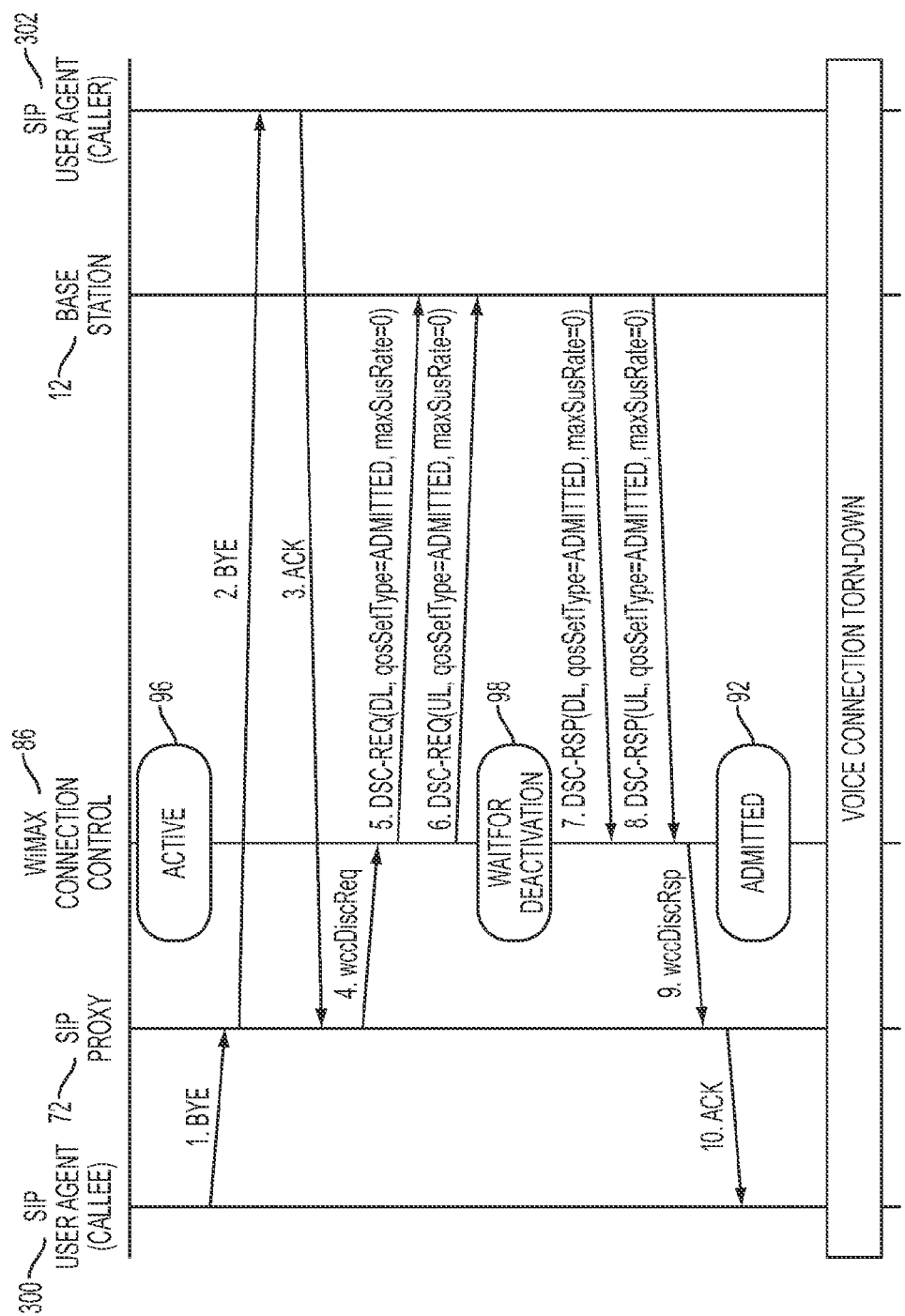
FIG. 15 is a signal diagram for a terminating call tear-down for the CPE of FIG. 3, according to one embodiment of the present invention.

FIG. 15 describes the terminating call torn-down scenario for IP phones 22 of FIGS. 1 and 3. In a first operation, the callee agent 300 sends a SIP BYE message to the SIP proxy 72. In a second operation, the SIP proxy 72 responds by sending a SIP BYE message to the caller agent 302, which in a third operation sends an ACK to the SIP proxy 72. In a fourth operation the SIP proxy 72 may responds by sending a wccDiscReq to the WCC 86 message to deactivate UL/DL service flows for a VoIP call. In fifth and sixth operations, the WCC 86 may respond to the wccDiscReq message by sending DSC-REQ messages for the UL and DL. Since this is the 1st VoIP call, the maxSusRate may be set to 0 and the qosSetType is set to Admitted. If it is not the 1st VoIP call, then maxSusRate may be decrement by 100 Kbps and the qosSetType is set to Admitted. After the sending of the DSC-REQs, the WCC 86 transitions to its WaitForActivation state 94. In seventh and eighth operations, the BS 12 may respond to the DSC-REQs by sending DSC-RSPs for the UL and DL, with maxSusRate=0. In a ninth operation, the WCC 86 may send wccDiscRsp to the SIP proxy 72. The WCC 86 may transition to its Admitted State 92. In a tenth operation, the SIP Proxy 72 may send an ACK to the callee agent 300.

FIGS. 16-19 are directed VoIP over WiMAX Call Scenarios for Analog Phones 26 of FIGS. 1 and 4, according to one embodiment of the present invention. WiMAX Connection control sends DSC-REQ message to activate UL/DL service flows for a VoIP call. Since this is the 1st VoIP call, the maxSusRate is set to 100 Kbps. If it is the 2nd call, then maxSusRate should be set to 100 Kbps. It is assuming this call use G.711 codec that requires roughly 100 Kbps with all overheads.

Figure 16:
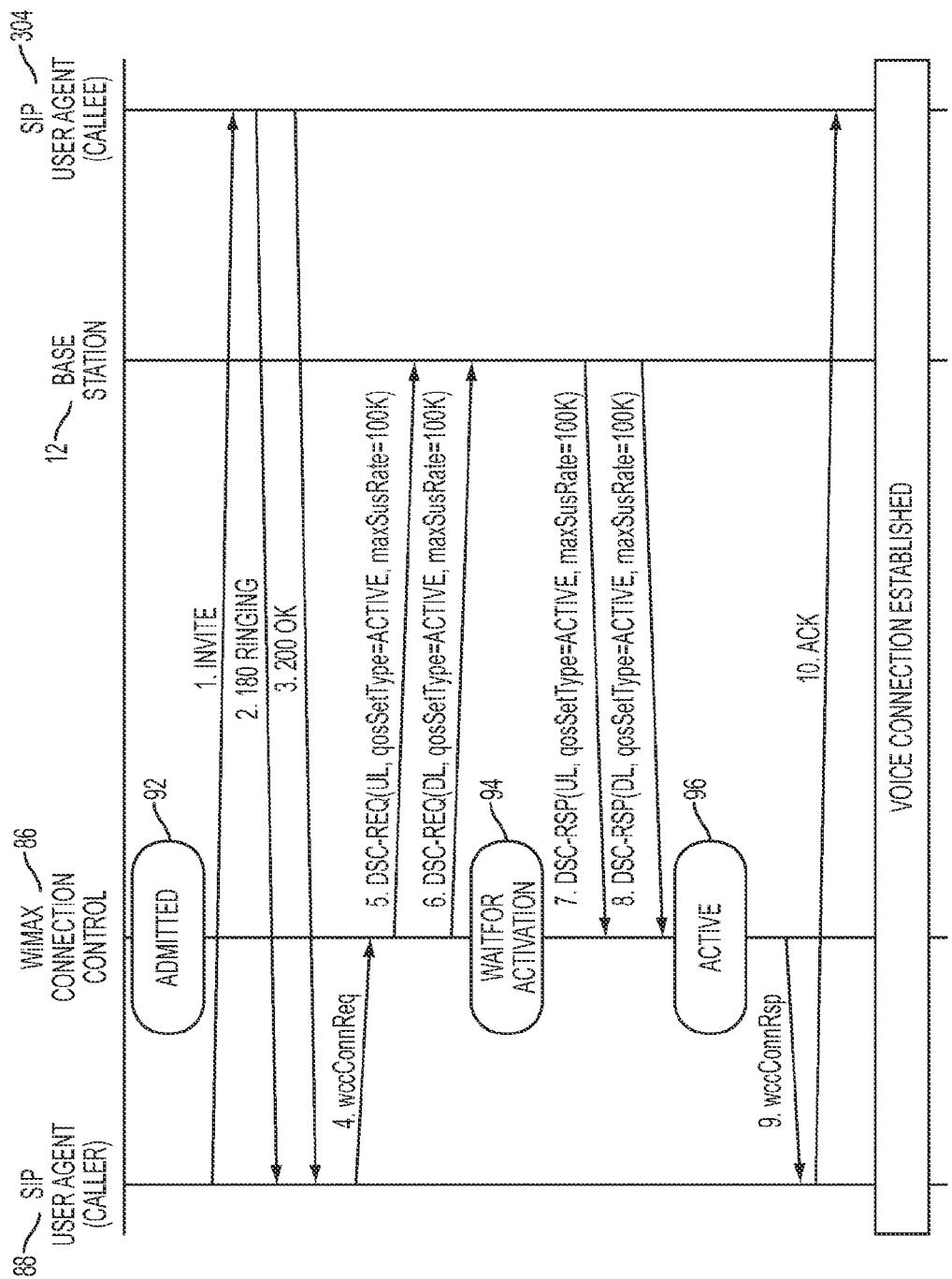
FIG. 16 is a signal diagram for an originating call setup for the CPE of FIG. 4, according to one embodiment of the present invention.

FIG. 16 depicts the originating call setup scenario for analog phones 26 of FIGS. 1 and 4. In the Admitted State 92 of the WCC 86, in a first operation, the SIP user agent 88 may send an INVITE to the callee user agent 304. In a second operation, a SIP 180 ringing signal may be sent from the callee agent 304 to the SIP user agent 88. In a third operation, the callee agent 304 may send a SIP 200 OK to the SIP user agent 88 to initiate the establishment of a VoIP call. In a fourth operation, in response to the SIP 200 OK, the SIP user agent 88 may send a wccConnReq message to the WCC 86 requesting bandwidth for a VoIP call. In response to the wccConnReq message, in fifth and sixth operations, the WCC 86 may send DSC-REQ messages to the BS 12 for the UL/DL, with the parameter set including qosSetType=active and maxSusRate=100 k, after which the WCC transitions to its WaitForActivation state 94. The same configurations of the packet classifiers occur as were discussed in FIG. 12. In seventh and eighth operations, the BS may respond with DSC-RSP messages for UL and DL, respectively, with the qosSetType set to active and maxSusRate=100 k, with the WCC transitioning to its Active State 96. In a ninth operation, the WCC 86 may send a wccConnRsp message to the SIP user agent 88. In a tenth operation, the SIP user agent 88 may send the ACK to the callee agent 304, after which a voice connection is established.

Figure 17:
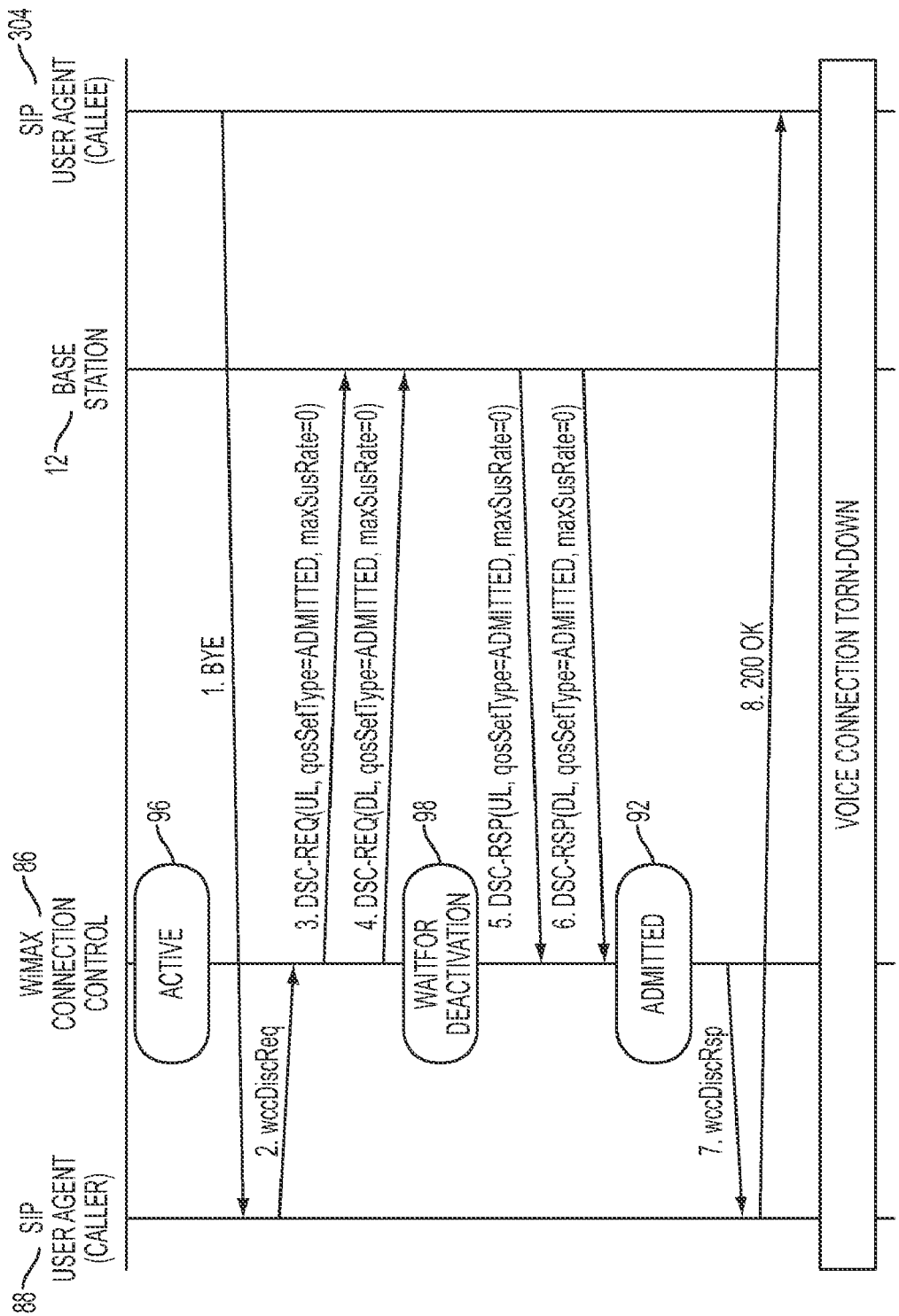
FIG. 17 is a signal diagram for an originating call tear-down for the CPE of FIG. 4, according to one embodiment of the present invention.

FIG. 17 shows the originating call tear-down scenario for the analog phones 26 of FIGS. 1 and 4. In a first operation, the SIP user agent 304 (callee agent) may send a SIP BYE message to the SIP user agent 88 (caller agent 88). In a second operation the caller agent 88 may responds by sending a wccDiscReq to the WCC 86 message to deactivate UL/DL service flows for a VoIP call. In third and fourth operations, the WCC 86 may respond to the wccDiscReq message by sending DSC-REQ messages for the UL and DL. Since this is the 1st VoIP call, the maxSusRate may be set to 0 and the qosSetType is set to Admitted. If it is not the 1 st VoIP call, then maxSusRate may be decrement by 100 Kbps and the qosSetType is set to Admitted. After the sending of the DSC-REQs, the WCC 86 transitions to its WaitForActivation state 94. In fifth and sixth operations, the BS 12 may respond to the DSC-REQs by sending DSC-RSPs for the UL and DL, with maxSusRate=0. The WCC 86 responds by transitioning to its Admitted State 92 and in a seventh operation, may send wccDiscRsp to the caller agent 88. In an eighth operation, the caller agent 88 may send the ACK on to the callee agent 304, which leads to the voice connection being torn down.

Figure 18:
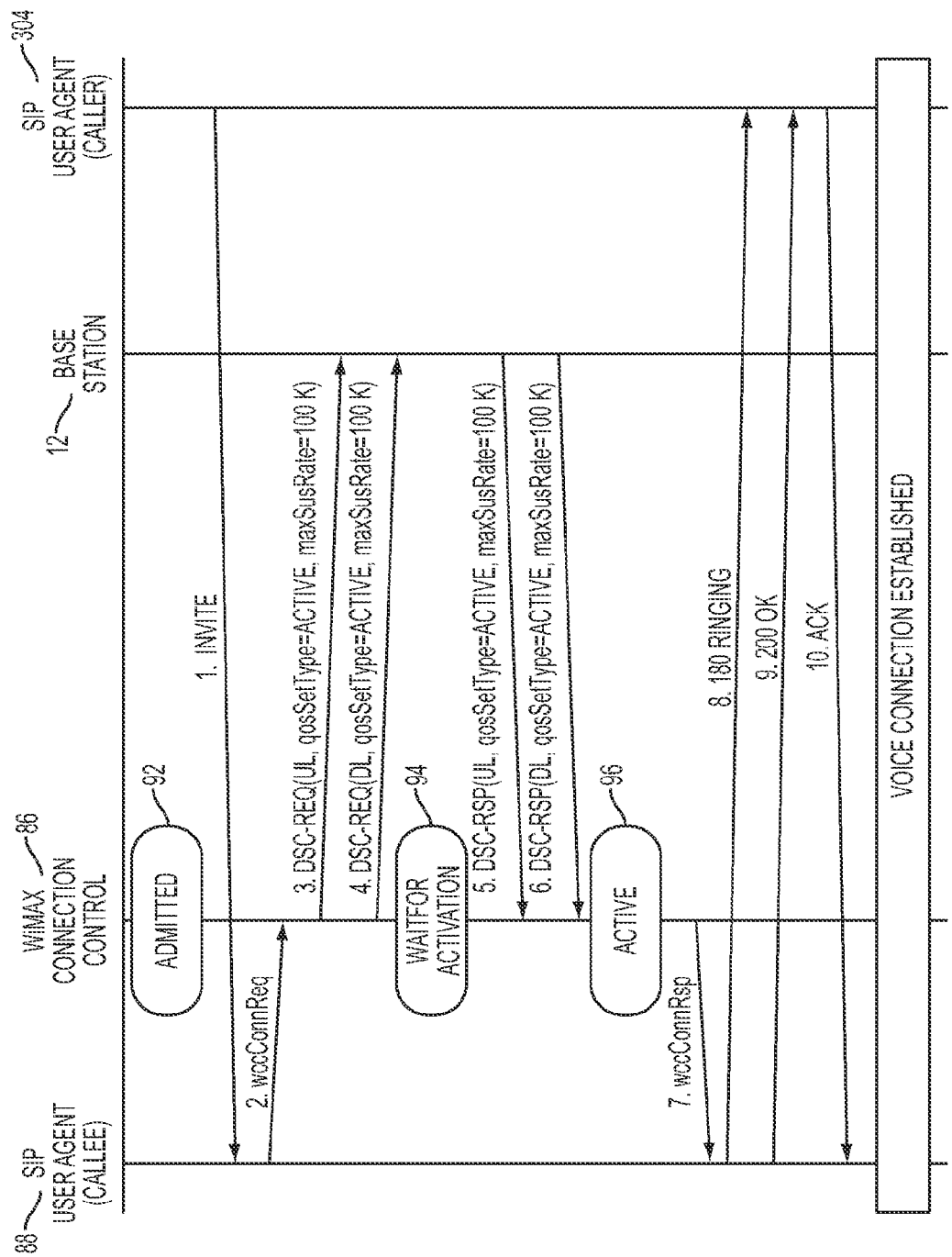
FIG. 18 is a signal diagram for a terminating call setup for the CPE of FIG. 4, according to one embodiment of the present invention.

FIG. 18 describes the terminating call setup scenario for the analog phones 26 of FIGS. 1 and 4. In the Admitted State 92 of the WCC 86, in a first operation, a SIP INVITE message may be transmitted from the caller agent 304 to the SIP user agent 88. In a second operation, in response to the SIP INVITE, the SIP user agent 88 may send a wccConnReq message to the WCC 86 requesting bandwidth for a VoIP call. In response to the wccConnReq message, in third and fourth operations, the WCC 86 may send DSC-REQ messages to the BS 12 for the UL/DL, with the parameter set including qosSetType=active and maxSusRate=100 k, after which the WCC transitions to its WaitForActivation state 94. In a fifth and sixth operations, the BS may respond with DSC-RSP messages for UL and DL, respectively, with the qosSetType set to active and maxSusRate=100 k and with the WCC transitioning to its Active State 96. In a seventh operation, the WCC 86 may send a wccConnRsp message to the SIP user agent 88. In eighth and ninth operations, the SIP user agent 88 may send a SIP 180 Ringing signal and SIP 200 OK signal to the caller agent 304. In a tenth operation, the caller agent 304 may send an SIP acknowledgment (ACK) to the SIP user agent 88, after which a voice connection is established.

Figure 19:
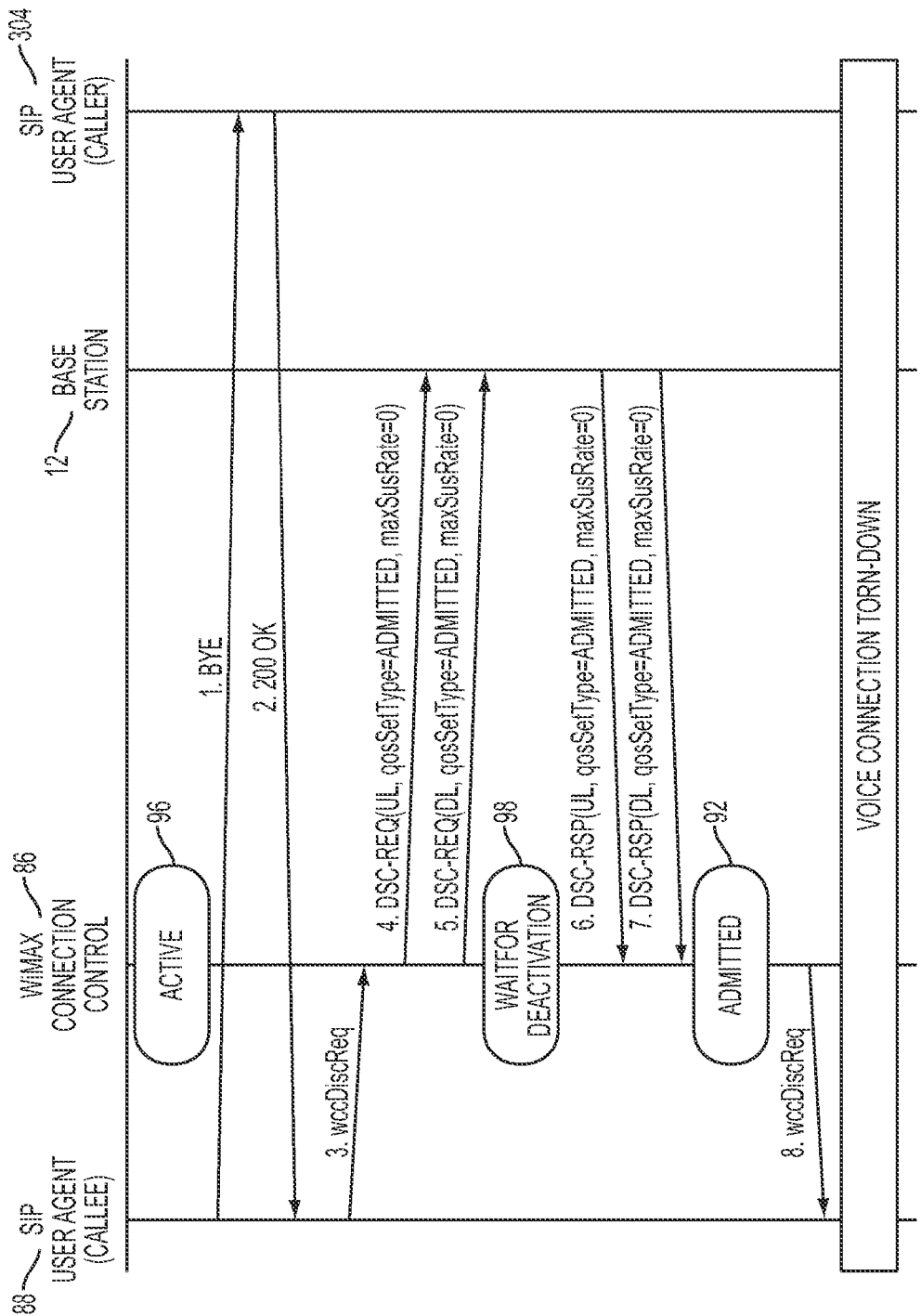
FIG. 19 is a signal diagram for a terminating call tear-down for the CPE of FIG. 4, according to one embodiment of the present invention.

Referring to FIG. 19, there is described a tear-down scenario for the terminating call for the analog phones 26 of FIGS. 1 and 4. In a first operation, the callee agent 88 may send a SIP BYE message to the caller agent 304. In a second operation, the caller agent 304 may respond by sending a SIP 200 OK message to the callee agent 88. In a third operation the callee agent 88 may responds by sending a wccDiscReq to the WCC 86 message to deactivate UL/DL service flows for a VoIP call. In fourth and fifth operations, the WCC 86 may respond to the wccDiscReq message by sending DSC-REQ messages for the UL and DL. Since this is the 1st VoIP call, the maxSusRate may be set to 0. If it is not the 1st VoIP call, then maxSusRate may be decrement by 100 Kbps. After the sending of the DSC-REQs, the WCC 86 transitions to its WaitForActivation state 94. In sixth and seventh operations, the BS 12 may respond to the DSC-REQs by sending DSC-RSPs for the UL and DL, with maxSusRate=0, with the WCC 86 transitioning to the Admitted State 92. In an eighth operation, the WCC 86 may send wccDiscRsp to the callee agent 88, with the voice connection then being torn down.

Figure 20:
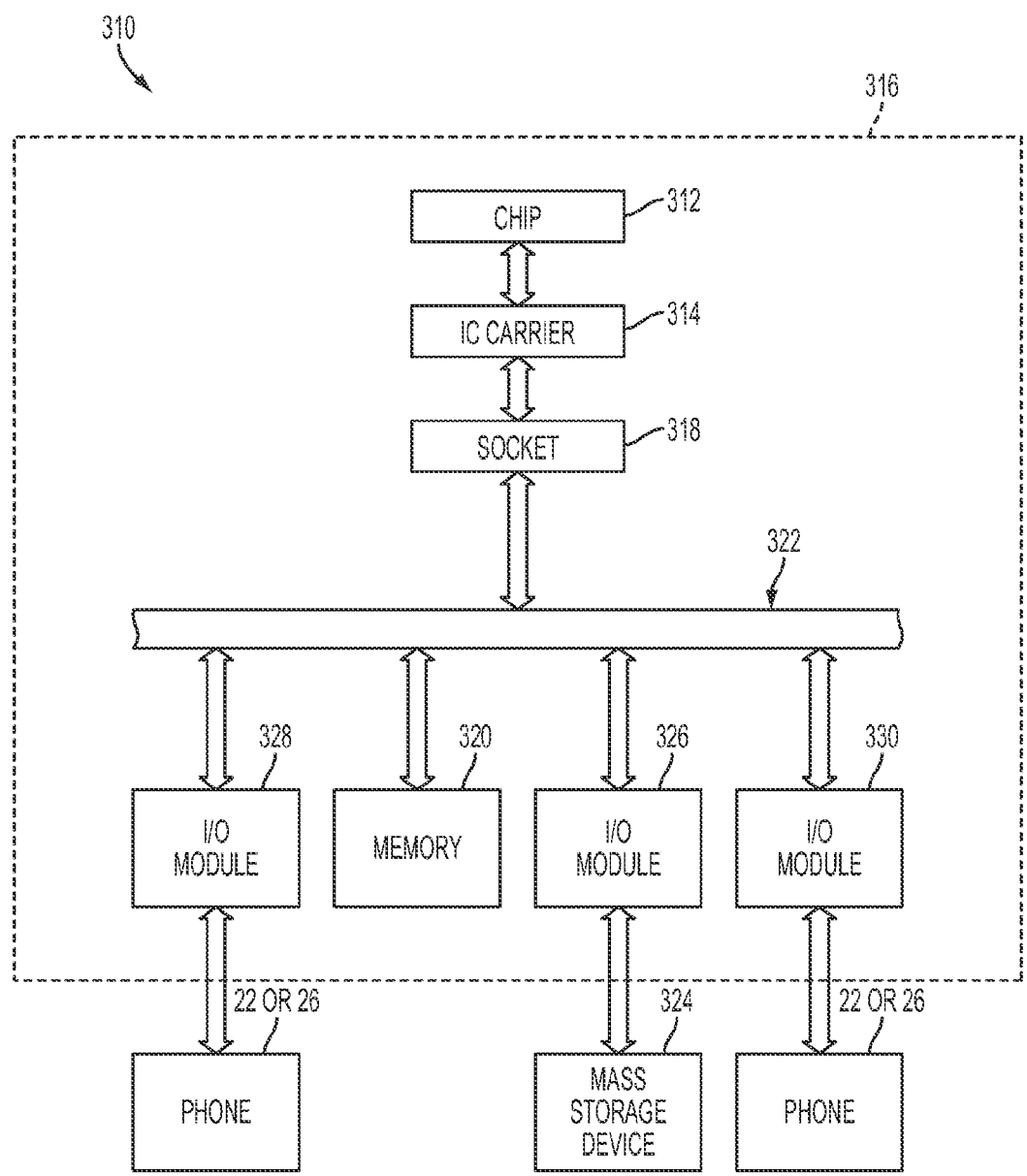
FIG. 20 is a block diagram of a CPE system, incorporating the various embodiments of the present invention.

Referring to FIG. 20, there is illustrated a CPE system 310, which may be the CPE 16 or 18 of FIGS. 3 and 4. The CPE system may include a processor (integrated circuit chip) 312 and an IC chip carrier 314 for mounting the chip 312. The IC chip carrier 314 may be mounted on a substrate or printed circuit board (PCB) 316 via a socket 318. However, in other systems the IC carrier 314 may be directly coupled to the PCB 316. The PCB 316 may have mounted thereon a main memory 320 and a plurality of input/output (I/O) modules for external devices or external buses, all coupled to each other by a bus system 322 on the PCB 316. The system 310 may further include a mass storage device 324 coupled to the bus system 322 via an I/O module 326. Additionally, two illustrative phones 22 or 26 may be coupled to the bus system 322 via I/O modules 328 and 330. Additional I/O modules may be included for other external or peripheral devices or external buses.

In some embodiments, with respect to the CPE system 310 taking the form of CPE 16 of FIG. 3, the call session module (SIP proxy 72) and the WCC module 86 of FIG. 3 may be software modules that are moved from the mass storage device 326 to the memory 318 for execution by the processor 312. In some embodiments, with respect to the CPE system 310 taking the form of CPE 18 of FIG. 4, the call session module (SIP user agent 88) and the WCC module 86 of FIG. 4 may be software modules that are moved from the mass storage device 326 to the memory 318 for execution by the processor 312. Although the call session and WCC modules are shown as software modules, in other embodiments they may be hard-wired.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:
   a connect control module adapted to receive a dynamic service addition message containing a reserved bandwidth amount of a reserved bandwidth allocation for an uplink service flow, with the reserved bandwidth allocation being capable of accommodating two or more Voice over Internet Protocol (VoIP) calls and the uplink service flow being substantially in accordance with an Institute of Electrical and Electronic Engineers (IEEE) 802.16 standard;
   a call session module, coupled to the connect control module, adapted to generate a connection request message for a VoIP connection; and
   the connect control module, in response to the connection request message, further adapted to send a dynamic service change request message to activate a call-session bandwidth portion of the reserved bandwidth allocation for the VoIP connection.

2. The apparatus according to claim 1, wherein
   the dynamic service addition message received by the connect control module is a dynamic service addition request message received by the connect control module; and
   the connect control module, in response to the dynamic service addition request message, is further adapted to send a dynamic service addition response message confirming a need for the reserved bandwidth allocation.

3. The apparatus according to claim 2, wherein the uplink service flow is a selected one of an Unsolicited Grant Service (UGS) flow or a Real-Time Polling Service (rtPS) flow.

4. The apparatus according to claim 2, wherein the connect control module, after sending the dynamic service change request message, is further adapted to receive a dynamic service change response message indicating an activation of the call-session bandwidth portion of the reserved bandwidth allocation.

5. The apparatus according to claim 4, wherein
   the connect control module, upon receiving the dynamic service addition request message, is further adapted to initialize an available bandwidth quantity with the reserved bandwidth amount;
   the connect control module, upon receiving the connection request message, is further adapted to determine if the available bandwidth quantity is equal to or greater than a bandwidth amount of the call-session bandwidth portion and if equal to or greater than the bandwidth amount of the call-session bandwidth portion, to send the dynamic service change request message; and
   the connect control module, upon receiving the dynamic service change response message, is further adapted to decrease the available bandwidth quantity by the bandwidth amount of the call-session bandwidth portion.

6. The apparatus according to claim 5, wherein
   the call session module, after generating the connection request message, is further adapted to generate a disconnection request message for the VoIP connection; and
   the connect control module, in response to the disconnection request message, is further adapted to send another dynamic service change request message to deactivate the previously-activated call-session bandwidth portion and to receive another dynamic service change response indicating a deactivation of the previously-activated call-session bandwidth portion.

7. The apparatus according to claim 6, wherein the connect control module, upon receiving the another dynamic service change response message, is further adapted to increase the available bandwidth quantity by the bandwidth amount of the deactivated call-session bandwidth portion.

8. The apparatus according to claim 6, wherein
   the connect control module is further adapted to transition from an initialization state to an admitted state upon sending the dynamic service addition response message;
   the connect control module is further adapted to transition from the admitted state to a wait-for-activation state upon sending the dynamic service change request message;
   the connect control module is further adapted to transition from the wait-for-activation state to an activate state upon receipt of the dynamic service change response message;
   the connect control module is further adapted to transition from the active state to a wait-for-deactivation state upon sending the another dynamic service change request message; and
   the connect control module is further adapted to transition from the wait-for-deactivation state to the admitted state upon receiving the another dynamic service response message.

9. The apparatus according to claim 8, wherein the connect control module has a provisioned bandwidth associated therewith when the connect control module is in the initialization state, with the provisioned bandwidth being equal to or greater than the reserved bandwidth allocation.

10. The apparatus according to claim 4, wherein
    the call session module, after generating the connection request message for the VoIP connection, is adapted to generate another connection request message for another VoIP connection;
    the connect control module, in response to the another connection request message, is further adapted to send another dynamic service change request message to activate another call-session bandwidth portion of the reserved bandwidth allocation for the another VoIP connection; and
    the uplink service flow contains the two VoIP connections upon the connect control module receiving another dynamic service change message indicating an activation of the another call-session bandwidth portion.

11. The apparatus according to claim 1, wherein the call session module is a Session Initiation Protocol (SIP) module.

12. The apparatus according to claim 11, wherein the SIP module is a SIP proxy and the apparatus further comprises at least two Internet Protocol (IP) phones coupled to the SIP proxy.

13. The apparatus according to claim 11, wherein the SIP module is a SIP user agent and the apparatus further comprises at least two analog phones coupled to the SIP module.

14. The apparatus according to claim 1, wherein the connect control module is further adapted to receive the dynamic service addition message from a base station and to send the dynamic service change request message to the base station.

15. A method, comprising:
    providing, by a subscriber station, an uplink service flow for the subscriber station with a reserved bandwidth allocation capable of including a plurality of Voice over Internet Protocol (VoIP) calls; the uplink service flow being substantially in accordance with an Institute of Electrical and Electronic Engineers (IEEE) 802.16 standard;
    activating, by the subscriber station, a first call-session bandwidth portion of the reserved bandwidth allocation in response to a first connection request message for a first VoIP call; and activating, by the subsciber station, at least a second call-session bandwidth portion of the reserved bandwidth allocation in response to at least a second connection request message for at least a second VoIP call.

16. The method according to claim 15, wherein the providing of the uplink service flow for the subscriber station includes
receiving by the subscriber station of a dynamic service addition request message containing an amount of the reserved bandwidth allocation; and
responding by the subscriber station to the dynamic service addition request message by sending a dynamic service addition response message confirming a need for the reserved bandwidth allocation.

17. The method according to claim 16, wherein the activating of the first call-session bandwidth portion includes
sending by the subscriber station of a dynamic service change request message to activate the first call-session bandwidth portion; and
receiving by the subscriber station of a dynamic service change response message indicating an activation of the first call-session bandwidth portion.

18. The method according to claim 17, wherein the activating the first call-session bandwidth portion further includes
initializing by the subscriber station of an available bandwidth quantity with the amount of the reserved bandwidth allocation;
upon receiving the first connection request message, determining by the subscriber station if the available bandwidth quantity is equal to or greater than an amount of the first call-session bandwidth portion and if equal to or greater than the amount of the first call-session bandwidth portion, sending by the subscriber station of the dynamic service change request message to activate the first call-session bandwidth portion; and
upon receiving the dynamic service change response message, decreasing by the subscriber station of the available bandwidth quantity by the amount of the call-session bandwidth portion.

19. The method according to claim 18, further comprising:
receiving by the subscriber station of a disconnection request message for the active first VoIP call having the previously-activated first call-session bandwidth portion;
in response to the disconnection request message, sending by the subscriber station of another dynamic service change request message to deactivate the previously-activated first call-session bandwidth portion; and
receiving by the subscriber station of another dynamic service change response message indicating a deactivation of the previously-activated first call-session bandwidth portion.

20. The method according to claim 19, further comprising:
upon receiving the another dynamic service change request message, increasing by the subscriber station of the available bandwidth quantity by the amount of the first call-session bandwidth portion.

21. The method according to claim 15, wherein the activating of the first and the second call-session bandwidth portions includes activating the first and the second call-session bandwidth portions at a base station.

22. A system, comprising:
a memory, a mass storage device and a processor coupled to each other;
a call-session module and a connect control module adapted to be stored in the mass storage device and to be moved to the memory by the processor, with the processor being adapted to execute the call-session module and the connect control module;
the connect control module adapted to receive a dynamic service addition message containing a reserved bandwidth amount of a reserved bandwidth allocation for an uplink service flow, with the reserved bandwidth allocation being capable of accommodating two or more Voice over Internet Protocol (VoIP) calls and the uplink service flow being substantially in accordance with an Institute of Electrical and Electronic Engineers (IEEE) 802.16 standard;
the call session module, coupled to the connect control module, adapted to generate a connection request message for a VoIP connection; and
the connect control module, in response to the connection request message, further adapted to send a dynamic service change request message to activate a call-session bandwidth portion of the reserved bandwidth allocation for the VoIP connection.

23. The system according to claim 22, wherein
the dynamic service addition message received by the connect control module is a dynamic service addition request message received by the connect control module; and
the connect control module, in response to the dynamic service addition request message, is further adapted to send a dynamic service addition response message confirming a need for the reserved bandwidth allocation.

24. The system according to claim 23, wherein the connect control module, after sending the dynamic service change request message, is further adapted to receive a dynamic service change response message indicating an activation of the call-session bandwidth portion of the reserved bandwidth allocation.

25. The system according to claim 24, wherein
the call session module, after generating the connection request message for the VoIP connection, is adapted to generate another connection request message for another VoIP connection;
the connect control module, in response to the another connection request message, is further adapted to send another dynamic service change request message to activate another call-session bandwidth portion of the reserved bandwidth allocation for the another VoIP connection; and
the uplink service flow contains the two VoIP connections upon the connect control module receiving another dynamic service change message indicating an activation of the another call-session bandwidth portion.

26. The system according to claim 24, wherein
the connect control module, upon receiving the dynamic service addition request message, is further adapted to initialize an available bandwidth quantity with the reserved bandwidth amount;
the connect control module, upon receiving the connection request message, is further adapted to determine if the available bandwidth quantity is equal to or greater than a bandwidth amount of the call-session bandwidth portion and if equal to or greater than the bandwidth amount of the call-session bandwidth portion, to send the dynamic service change request message; and
the connect control module, upon receiving the dynamic service change response message, is further adapted to decrease the available bandwidth quantity by the bandwidth amount of the call-session bandwidth portion.

27. An article comprising a non-transitory machine-readable medium that contains instructions of a connection control program for a subscriber station, which when executed by the subscriber station, causes the subscriber station to perform operations comprising:

providing an uplink service flow for a subscriber station with a reserved bandwidth allocation capable of including a plurality of Voice over Internet Protocol (VoIP) calls; the uplink service flow being substantially in accordance with an Institute of Electrical and Electronic Engineers (IEEE) 802.16 standard;

activating a first call-session bandwidth portion of the reserved bandwidth allocation by the subscriber station in response to a first connection request message for a first VoIP call; and activating at least a second call-session bandwidth portion of the reserved bandwidth allocation in response to at least a second connection request message for at least a second VoIP call.

28. The article according to claim 27, wherein the providing of the uplink service flow for the subscriber station includes receiving by the subscriber station of a dynamic service addition request message containing an amount of the reserved bandwidth allocation; and responding by the subscriber station to the dynamic service addition request message by sending a dynamic service addition response message confirming a need for the reserved bandwidth allocation.

29. The article according to claim 28, wherein the activating of the first call-session bandwidth portion includes executing the instructions for sending by the subscriber station of a dynamic service change request message to activate the first call-session bandwidth portion; and receiving by the subscriber station of a dynamic service change response message indicating an activation of the first call-session bandwidth portion.

30. The article according to claim 29, wherein the activating the first call-session bandwidth portion further includes executing the instructions for initializing by the subscriber station of an available bandwidth quantity with the amount of the reserved bandwidth allocation;

upon receiving the first connection request message, determining by the subscriber station if the available bandwidth quantity is equal to or greater than an amount of the first call-session bandwidth portion and if equal to or greater than the amount of the first call-session bandwidth portion, sending by the subscriber station of the dynamic service change request message to activate the first call-session bandwidth portion; and upon receiving the dynamic service change response message, decreasing by the subscriber station of the available bandwidth quantity by the amount of the call-session bandwidth portion.

* * * * *